United States Patent
Miyamoto et al.

(10) Patent No.: US 10,205,297 B2
(45) Date of Patent: Feb. 12, 2019

(54) NARROW BAND EXCIMER LASER APPARATUS

(71) Applicant: Gigaphoton Inc., Tochigi (JP)

(72) Inventors: Hirotaka Miyamoto, Oyama (JP); Osamu Wakabayashi, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 15/912,633

(22) Filed: Mar. 6, 2018

(65) Prior Publication Data
US 2018/0198253 A1  Jul. 12, 2018

Related U.S. Application Data

(63) Continuation of application No. PCT/JP2015/080386, filed on Oct. 28, 2015.

(51) Int. Cl.
| | | |
|---|---|---|
| *H01S 3/137* | (2006.01) | |
| *H01S 3/225* | (2006.01) | |
| *H01S 3/036* | (2006.01) | |
| *H01S 3/134* | (2006.01) | |

(52) U.S. Cl.
CPC ............. *H01S 3/137* (2013.01); *H01S 3/036* (2013.01); *H01S 3/134* (2013.01); *H01S 3/225* (2013.01)

(58) Field of Classification Search
CPC .......... H01S 3/137; H01S 3/225; H01S 3/036; H01S 3/134
See application file for complete search history.

(56) References Cited

U.S. PATENT DOCUMENTS

| | | | |
|---|---|---|---|
| 2002/0044586 A1 | 4/2002 | Myers et al. | |
| 2015/0249312 A1* | 9/2015 | Tsushima | H01S 3/2251 372/58 |
| 2018/0026414 A1 | 1/2018 | Kurosu et al. | |

FOREIGN PATENT DOCUMENTS

| | | | |
|---|---|---|---|
| JP | 2000-124534 A | 4/2000 |
| JP | 2000-236125 A | 8/2000 |
| JP | 2001-135883 A | 5/2001 |
| JP | 2002-084026 A | 3/2002 |
| JP | 2002-198604 A | 7/2002 |

(Continued)

OTHER PUBLICATIONS

International Search Report issued in PCT/JP2015/080386; dated Jan. 19, 2016.

(Continued)

*Primary Examiner* — Xinning (Tom) Niu
(74) *Attorney, Agent, or Firm* — Studebaker & Brackett PC

(57) ABSTRACT

A narrow band excimer laser apparatus includes a line narrowing module that narrows the spectral line width of laser light, a nitrogen gas introducing unit, a first valve that restricts the flow of nitrogen gas from the introducing unit into a casing of the module, an exhaust unit that causes gas to flow out from the casing, an exhaust pump for exhausting the gas from the casing, a second valve that restricts the exhausting of gas from the exhaust unit, an atmosphere discharge unit that discharges the gas within the casing into the atmosphere, a third valve that restricts the discharge of gas into the atmosphere, and a control unit that closes the second valve while opening the first and third valves, supplies nitrogen gas into the casing, then closes the third valve while opening the first and second valves, drives the exhaust pump, and causes laser oscillation thereafter.

13 Claims, 17 Drawing Sheets

(56) References Cited

FOREIGN PATENT DOCUMENTS

| | | |
|---|---|---|
| JP | 2003-503861 A | 1/2003 |
| JP | 2003-133622 A | 5/2003 |
| JP | 2003-249702 A | 9/2003 |
| JP | 2003-258337 A | 9/2003 |
| JP | 2003-283007 A | 10/2003 |
| WO | 2015/068205 A1 | 5/2015 |

OTHER PUBLICATIONS

Written Opinion of the International Searching Authority issued in PCT/JP2015/080386; dated Jan. 19, 2016.

* cited by examiner

NARROW BAND EXCIMER LASER APPARATUS

CROSS REFERENCE TO RELATED APPLICATIONS

The present application is a Continuation application of International Application No. PCT/JP2015/080386 filed on Oct. 28, 2015. The contents of this application are incorporated herein by reference in its entirety.

BACKGROUND

1. Technical Field

The present disclosure is related to a narrow band excimer laser apparatus.

2. Related Art

Accompanying miniaturization and increased levels of integration of semiconductor integrated circuits, improvement of resolving power is desired in semiconductor exposure apparatuses. Hereinafter, semiconductor exposure apparatuses will simply be referred to as "exposure apparatuses". For this reason, the wavelength of light output from exposure light sources is being shortened. Gas laser apparatuses are being used in place of conventional mercury lamps as light sources for exposure. Currently, a KrF excimer laser apparatus that outputs ultraviolet light with a wavelength of 248 nm and an ArF excimer laser apparatus that outputs ultraviolet light with a wavelength of 193 nm are being employed as gas laser apparatuses for exposure.

Immersion exposure, in which a gap between a projection lens on the side of an exposure apparatus side and a wafer is filled with a liquid and the refractive index of the gap is changed to shorten the apparent wavelength of the exposure light source, is in practical use as a current exposure technique. When immersion exposure is performed using an ArF excimer laser apparatus as a light source for exposure, the wafer is irradiated with ultraviolet light having a wavelength of 134 nm in water. This technique is referred to as ArF liquid immersion exposure. ArF liquid immersion exposure is also referred to as ArF liquid immersion lithography.

The spectral linewidth in natural oscillation of the KrF or ArF excimer laser device is as wide as approximately 350 to 400 pm. Therefore, chromatic aberration of the laser light (ultraviolet light), which is reduced and projected onto the wafer by the projection lens on the exposure apparatus side, is generated, and resolving power decreases. Accordingly, it is necessary to narrow the spectral line width of the laser light output from the gas laser device until the chromatic aberration becomes negligible. Spectral linewidth is also referred to as spectral width. For this reason, a band narrowing module (Line Narrowing Module) having a band narrowing element is provided in a laser resonator of the gas laser apparatus, and narrowing of spectrum width is realized by this band narrowing module. Note that the band narrowing element may be an etalon, a grating or the like. Such a laser apparatus in which the spectrum width is narrowed is called a narrow band laser apparatus.

RELATED ART DOCUMENTS

Patent Documents

[Patent Document 1]
 Japanese Unexamined Patent Publication No. 2003-258337
[Patent Document 2]
 Japanese Unexamined Patent Publication No. 2003-283007
[Patent Document 3]
 PCT Japanese Phase Publication No. 2003-503841
[Patent Document 4]
 Japanese Unexamined Patent Publication No. 2001-135883
[Patent Document 5]
 Japanese Unexamined Patent Publication No. 2002-84026

SUMMARY

A narrow band excimer laser device according to one aspect of the present disclosure may be equipped with: an optical resonator; a laser chamber that contains an excimer laser gas and is disposed along an optical path of the optical resonator; a line narrowing module including a casing and a line narrowing optical element housed in the casing, the line narrowing module being provided in the optical resonator and being configured to narrow a spectral line width of laser light which is output from the laser chamber; a nitrogen gas supply apparatus; a nitrogen gas introducing unit configured to cause nitrogen gas supplied from the nitrogen gas supply apparatus to flow into the casing; a first valve configured to control inflow of nitrogen gas from the nitrogen gas introducing unit into the casing; an exhaust unit configured to cause gas within the casing to flow outside the casing; an exhaust pump configured to cause gas within the casing to be exhausted outside the casing through the exhaust unit; a second valve configured to control exhausting of gas from the exhaust unit; an atmosphere discharging unit configured to discharge gas within the casing to the atmosphere; a third valve configured to control discharging of gas by the atmosphere discharging unit; and a control unit configured to close the second valve while opening the first valve and the third valve to supply nitrogen gas into the casing for a predetermined amount of time, then to close the first valve and the third valve while opening the second valve and driving the exhaust pump to exhaust the interior of the casing, and to cause laser oscillation thereafter.

A narrow band excimer laser according to another aspect of the present disclosure may be equipped with: an optical resonator; a laser chamber that contains an excimer laser gas and is disposed along an optical path of the optical resonator; a line narrowing module including a casing and a line narrowing optical element housed in the casing, the line narrowing module being provided in the optical resonator and being configured to narrow a spectral line width of laser light which is output from the laser chamber; a nitrogen gas supply apparatus; a nitrogen gas introducing unit configured to cause nitrogen gas supplied from the nitrogen gas supply apparatus to flow into the casing; a first valve configured to control inflow of nitrogen gas from the nitrogen gas introducing unit into the casing; an exhaust unit configured to cause gas within the casing to flow outside the casing; an exhaust pump configured to cause gas within the casing to be exhausted outside the casing through the exhaust unit; a second valve configured to control exhausting of gas from the exhaust unit; an atmosphere discharging unit configured to discharge gas within the casing to the atmosphere; a third valve configured to control discharging of gas by the atmosphere discharging unit; and a control unit configured to close the second valve while opening the first valve and the third valve to supply nitrogen gas into the casing for a predetermined amount of time, then to close the third valve while opening the first valve and the second valve and driving the exhaust pump to exhaust the interior of the casing, and to cause laser oscillation thereafter.

BRIEF DESCRIPTION OF THE DRAWINGS

Embodiments of the present disclosure will be described below as examples, with reference to the attached drawings.

DETAILED DESCRIPTION OF EXEMPLARY EMBODIMENTS

Figure 1:
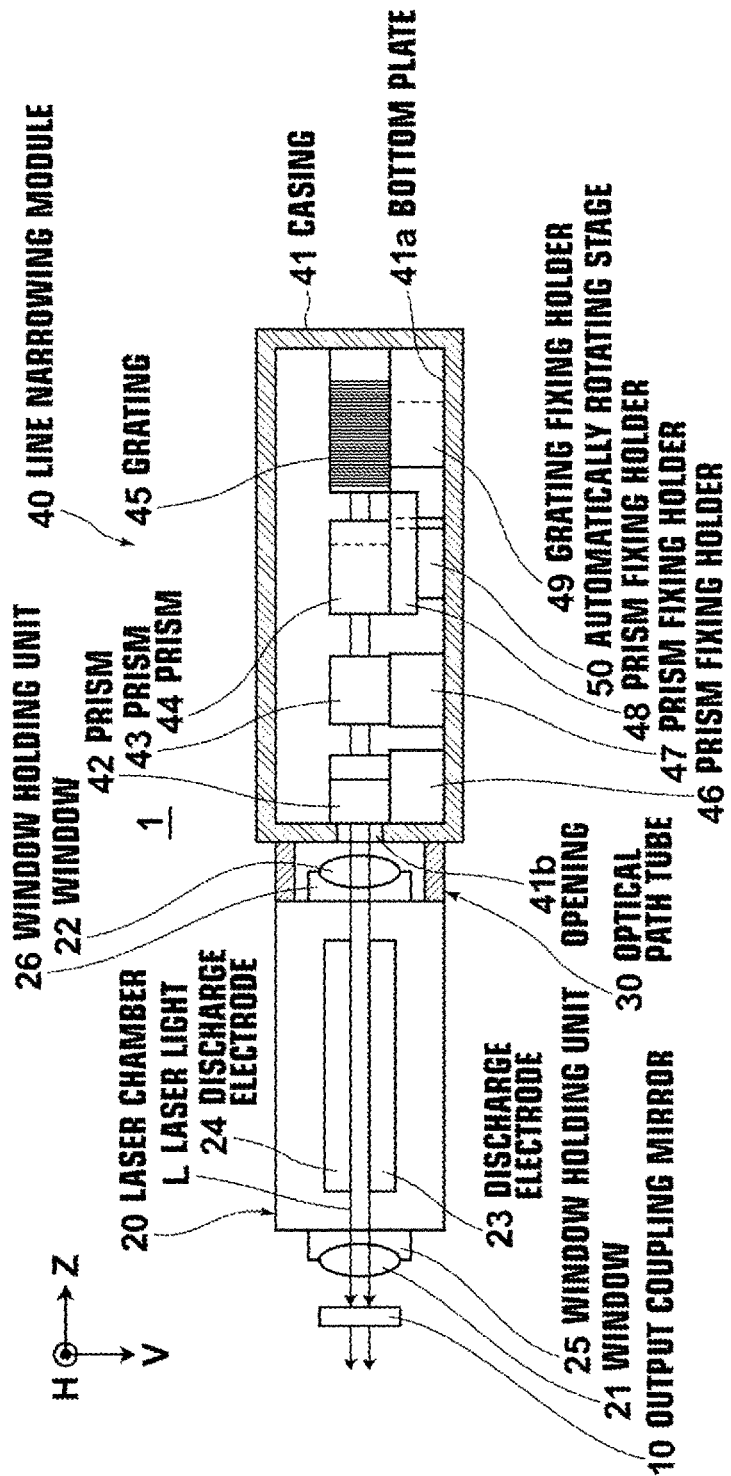
FIG. 1 is a partially cross sectional side view that schematically illustrates the configuration of an exemplary narrow band excimer laser apparatus.

—Contents—
1. Overview of Narrow Band Excimer Laser Apparatus
    1.1 Configuration
    1.2 Operation
2. Terms
3. Comparative Example
    3.1 Configuration of the Comparative Example
    3.2 Operation of the Comparative Example
    3.3 Problem of the Comparative Example
4. First Embodiment
    4.1 Configuration of the First Embodiment
    4.2 Operation of the First Embodiment
    4.3 Functions and Effects of the First Embodiment
    4.4 Supplementary Examples of Operation of the First Embodiment
5. Second Embodiment
    5.1 Configuration of the Second Embodiment
    5.2 Operation of the Second Embodiment
    5.3 Functions and Effects of the Second Embodiment
    5.4 Supplementary Example of Operation of the Second Embodiment
6. Modification of the Second Embodiment
    6.1 Configuration of the Modification of the Second Embodiment
    6.2. Operation of the Modification of the Second Embodiment
    6.3 Functions and Effects of the Modification of the Second Embodiment
7. Third Embodiment
    7.1 Configuration of the Third Embodiment
    7.2 Operation of the Third Embodiment
    7.3 Functions and Effects of the Third Embodiment
8. Fourth Embodiment
    8.1 Configuration of the Fourth Embodiment
    8.2 Operation of the Fourth Embodiment
    8.3 Functions and Effects of the Fourth Embodiment
9. Control Unit
    9.1 Configuration of the Control Unit
    9.2 Functions of the Control Unit
    9.3 Devices Connected to the Control Unit Hereinafter, embodiments of the present disclosure will be described in detail while referring to the attached drawings.

The embodiments to be described below are illustrative examples of the present disclosure, and do not limit the scope of the present disclosure. In addition, not all of the configurations and operations of the embodiments to be described below are necessarily essential configurations and operations of the present disclosure. Note that common constituent elements will be denoted by the same reference numerals, and redundant descriptions will be omitted.

1. Overview of Narrow Band Excimer Laser Apparatus
    1.1 Configuration

Figure 2:
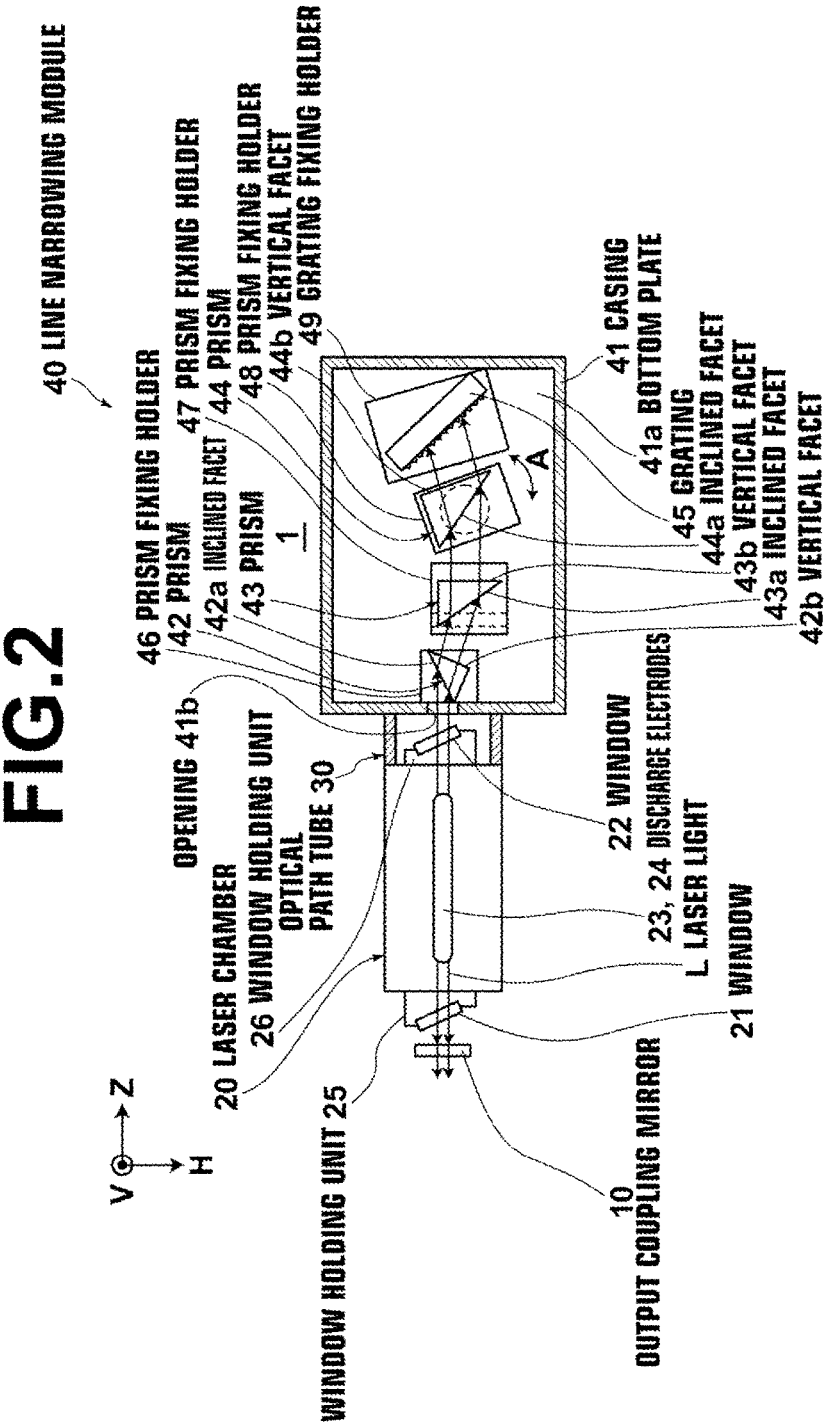
FIG. 2 is a partially cross sectional plan view that schematically illustrates the configuration of the narrow band excimer laser apparatus illustrated in FIG. 1.

FIG. 1 and FIG. 2 schematically illustrate the configuration of an exemplary narrow band excimer laser apparatus 1. FIG. 1 is a partially cross sectional side view of the narrow band excimer laser apparatus 1, and FIG. 2 is a partially cross sectional plan view of the narrow band excimer laser apparatus 1.

In the present disclosure, the propagating direction of laser light within a laser chamber is defined as a Z direction. In addition, a direction which is parallel to the plane on which the narrow band excimer laser apparatus 1 is placed and perpendicular to the Z direction is defined as an H direction. A direction which is perpendicular to the Z direction and the H direction is defined as a V direction. Note that under a state of normal use of the narrow band excimer laser apparatus 1, the H direction is the horizontal direction and the V direction is the vertical direction.

As illustrated in FIG. 1 and FIG. 2, the narrow band excimer laser apparatus 1 may include an output coupling mirror 10, a laser chamber 20, an optical path tube 30, and a line narrowing module (LNM) 40. The output coupling mirror 10 and the line narrowing module 40 may constitute an optical resonator. The laser chamber 20 may be provided along the optical path of the optical resonator. The line narrowing module 40 may be provided within the optical resonator.

The laser chamber 20 may be equipped with windows 21 and 22, and a pair of discharge electrodes 23 and 24. The windows 21 and 22 may be held respectively by window holding units 25 and 26, which are provided on the laser chamber 20. The windows 21 and 22 may be provided such that laser light L, which is amplified after being discharge pumped between the discharge electrodes 23 and 24, passes therethrough. The windows 21 and 22 may be inclined to be in a state that forms an extremely small angle with respect to the optical path of the laser light L such that the plane of incidence of the laser light L includes the H direction. The angle of inclination may be the Brewster angle or an angle close to the Brewster angle.

The interior of the laser chamber 20 may be filled with an excimer laser gas. The excimer laser gas may be a mixture of Ar gas or Kr gas which is a rare gas, $F_2$ gas which is a halogen gas, and Ne gas which is a buffer gas.

The pair of discharge electrodes 23 and 24 may face each other within the laser chamber 20 in the V direction, and be provided such that the longitudinal directions thereof are aligned with the Z direction. The pair of discharge electrodes 23 and 24 may be provided such that the longitudinal directions thereof are parallel to the optical path of the optical resonator. Pumping power may be supplied to the discharge electrodes 23 and 24 from a power source, which is not illustrated.

The line narrowing module 40 may include a casing 41 and a line narrowing optical element housed within the casing 41. A plurality of line narrowing optical elements may be provided, and may be, for example, three prisms 42, 43, and 44, and a grating 45. A prism fixing holder 46 for fixing the prism 42, a prism fixing holder 47 for fixing the prism 43, a prism fixing holder 48 for fixing the prism 44, and a grating fixing holder 49 for fixing the grating 45 may be mounted on a bottom plate 41a of the casing 41. Note that the prism fixing holder 48 may be mounted on the bottom plate 41a via an automatically rotating stage 50. The prism fixing holder 48 may be rotatable in the direction indicated by arrow A in FIG. 2 about an axis of rotation that extends in the V direction, by the automatically rotating stage 50 being driven.

The three prisms 42, 43, and 44 may be disposed such that they function as a beam expander that enlarges the beam diameter of the laser light L. Low reflectance coatings that exhibit low reflectance with respect to P polarized components of the laser light L may be coated on the inclined facets of the prisms 42, 43, and 44, that is, facets 42a, 43a, and 44a into which the laser light L enters obliquely. Meanwhile, low reflectance coatings that exhibit low reflectance with respect to the laser light L may be coated on the vertical facets of the prisms 42, 43, and 44, that is, facets 42b, 43b, and 44b into which the laser light L enters perpendicularly.

The grating 45 and the output coupling mirror 10 may form an optical resonator. The grating 45 may have a function of a wavelength selecting unit that selects the wavelength of the laser light L that reciprocates within the optical resonator. The grating 45 may be disposed in a Littrow configuration such that the incident angle matches the diffraction angle. The grating 45 may be an echelette grating having a grating pitch and a blaze angle which are determined such that the laser light L with a central wavelength of 193 nm, for example, is diffracted at a high efficiency.

The casing 41 of the line narrowing module 40 may have an opening 41b. The opening 41b may be provided at a position where the laser light L, which is output from the laser chamber 20 and is transmitted through the window 22, passes through. The casing 41 may be of a configuration that maintains the interior of the casing 41 gastight with respect to the exterior at portions other than the opening 41b.

The optical path tube 30 may be disposed between the laser chamber 20 and the casing 41. The optical path tube 30 may be configured to cover the optical path of the laser light L, which is output from the laser chamber 20 and is transmitted through the window 22.

1.2 Operation

In the configuration described above, when high voltage is applied to the discharge electrodes 23 and 24, the electrical discharge occurs between the discharge electrode 23 and the discharge electrode 24. Laser gas is pumped by the electrical discharge, and spontaneously emitted light is generated from a laser medium that includes rare gas and halogen gas. The spontaneously emitted light may be ultraviolet light, for example, having a wavelength of 193 nm or a wavelength of 248 nm as described previously. The light may be transmitted through the window 22 and enter the line narrowing module 40. The beam diameter of the light may be enlarged by the prisms 42 through 44, and then enter the grating 45.

The ultraviolet light that enters the grating 45 may be selectively diffracted to a narrow band wavelength at the grating 45. The diffracted light may propagate along the same optical path along which the ultraviolet light entered the grating 45, and reenter the laser chamber 20. Note that if the prism 44 is rotated by the automatically rotating stage 50 via the prism fixing holder 48, the incident angle of the light that enters the grating 45 may be changed. Thereby, the wavelength which is selected by the grating 45 may be adjusted.

The light which has reentered the laser chamber 20 may be amplified by passing through the electrical discharge region. The amplified light is transmitted through the window 21 and enters the output coupling mirror 10. A portion of the amplified light is transmitted through the output coupling mirror 10, and a portion is reflected by the output coupling mirror 10. The reflected light returns to the laser chamber 20, and is amplified by passing through the electrical discharge region. By the above being repeated, light may resonate within the optical resonator which is constituted by the output coupling mirror 10 and the grating 45, and the laser light L may oscillate.

2. Terms

Figure 3:
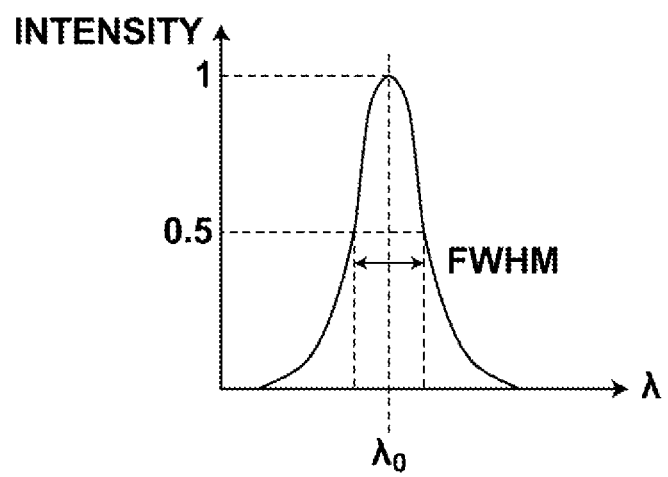
FIG. 3 is a schematic diagram for explaining the terms which are employed in the present disclosure.

The terms which are utilized in the present disclosure are defined as follows. A "spectral line width" is the full width of the spectral waveform of laser light at a light intensity threshold value, as illustrated in FIG. 3. In the present disclosure, the relative value of each light intensity threshold value with respect to a light intensity peak value will be referred to as a line width threshold value "Thresh". Note that Thresh satisfies "0<Thresh<1". For example, the half value of the peak value will be referred to as "line width threshold value 0.5". Note that the full width W½ of the spectral waveform at line width threshold value 0.5 will be specially referred to as FWHM (Full Width at Half Maximum).

Figure 4:
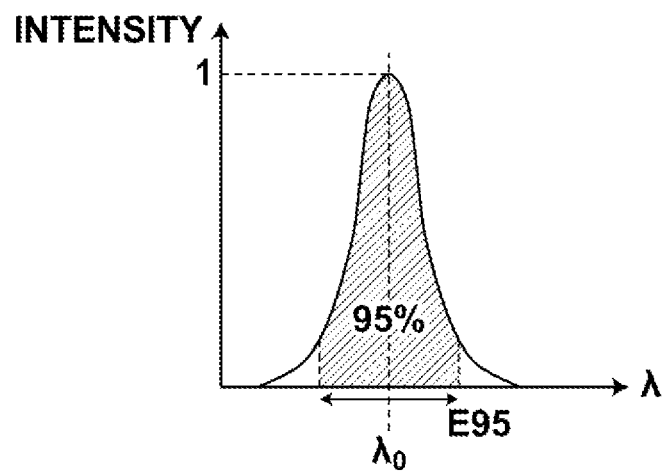
FIG. 4 is a schematic diagram for explaining the terms which are employed in the present disclosure.

As illustrated in FIG. 4, a spectral purity, 95% purity E95 for example, is a full width W95% that occupies 95% of total spectral energy having a wavelength $\lambda_0$ as its center, and Formula (1) below is established.

[Formula 1]

$$\frac{\int_{-\frac{\Delta\lambda}{2}}^{\frac{\Delta\lambda}{2}} g(\lambda + \lambda_0) d\lambda}{\int_{-\infty}^{\infty} g(\lambda + \lambda_0) d\lambda} = 0.95 \quad (1)$$

In the present disclosure, a description will be given with the spectral purity as E95, unless particularly noted otherwise. In the present disclosure, "spectral line width" means "a full width W that occupies 95% of total spectral energy having a wavelength $\lambda_0$ as its center".

3. Comparative Example 3.1 Configuration of the Comparative Example

Figure 5:
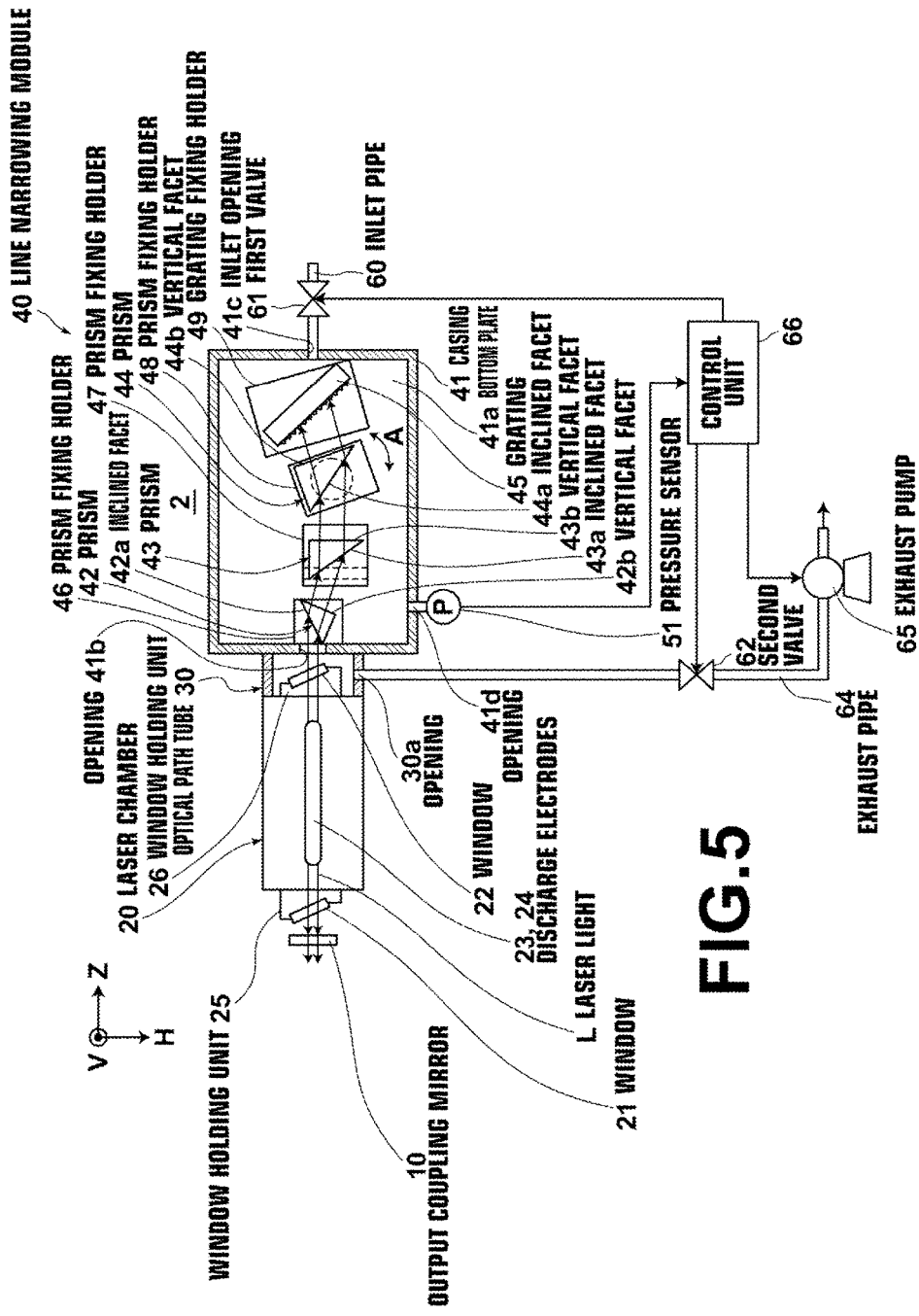
FIG. 5 is a partially cross sectional plan view that schematically illustrates the configuration of a narrow band excimer laser apparatus of a comparative example.

FIG. 5 is a partially cross sectional plan view that schematically illustrates the configuration of a narrow band excimer laser apparatus 2 of a comparative example. In the configuration of FIG. 5, constituent elements which are the same as those illustrated in FIG. 2 will be denoted by the same reference numerals, and redundant descriptions will be omitted.

Hereinafter, portions of the configuration of the comparative example which are different from the configuration of FIG. 2 will be described. Note that in the present comparative example, the configurations other than the points of difference from the configuration of FIG. 2, to be described below, may be the same as those of FIG. 2.

The casing 41 of the line narrowing module 40 may have an inlet opening 41c that enables the exterior atmosphere to flow into the casing 41, and an opening 41d provided to measure the pressure within the casing 41. In the present comparative example, the opening 41b may function as an exhaust port for exhausting gas from within the casing 41, in addition to being an opening through which the laser light L passes. The casing 41 may be of a configuration that maintains the interior of the casing 41 gastight with respect to the exterior at portions other than the opening 41b, the inlet opening 41c, and the opening 41d.

An opening 30a may be provided in the optical path tube 30. The optical path tube 30 may be of a configuration that maintains the interior of the optical path tube 30 gastight with respect to the exterior at portions other than the opening 30a.

An inlet pipe 60 may be in communication with the inlet opening 41c of the casing 41. A first valve 61 may be provided in the inlet pipe 60. One end of an exhaust pipe 64 may be in communication with the opening 30a of the optical path tube 30. The other end of the exhaust pipe 64 may be connected to an exhaust pump 65, which is a vacuum pump for example. A second valve 62 may be provided in the exhaust pipe 64 between the exhaust pump 65 and the optical path tube 30. A pressure sensor 51 that measures the pressure of the interior of the casing 41 through the opening 41d may be mounted on the casing 41.

A control unit 66 that controls the opening and closing operations of each of the first valve 61 and the second valve 62 as well as the driving operations of the exhaust pump 65 may be provided. Detected pressure signals output from the pressure sensor 51, that is, signals that represent the pressure of the interior of the casing 41, may be input to the control unit 66.

3.2 Operation of the Comparative Example

In the narrow band excimer laser apparatus 2 of the comparative example, if impure gas is present within the casing 41 of the line narrowing module 40, such impurities may adhere to the light transmitting facets of the prisms 42 through 44 and the grating surface of the grating 45 during operation of the laser apparatus, causing deterioration of the prisms 42 through 44 and the grating 45. If the prisms 42 through 44 and the grating 45 deteriorate, the light output of the narrow band excimer laser apparatus 2 may decrease, or the spectral line width of the laser light L may increase. Impure gas may be removed from the interior of the casing 41 of the line narrowing module 40 by a so called vacuum suction process, in order to prevent these problems. This process may be executed by the control unit 66 closing the first valve 61 while opening the second valve 62, and driving the exhaust pump 65 until the pressure within the casing 41 indicated by the pressure sensor 51 decreases to a predetermined value, to exhaust the interior of the casing 41. Note that the above process may be executed, for example, when a new line narrowing module 40 is installed in replacement of the line narrowing module 40 in the narrow band excimer laser apparatus 2.

3.3 Problem of the Comparative Example

However, there is a possibility that impure gas will remain within the casing 41 even if the exhaust process described above is executed, resulting in deterioration of the line narrowing elements, that is, the prisms 42 through 44 and the grating 45, during operation of the narrow band excimer laser apparatus 2.

In addition, if the interior of the casing 41 is depressurized by the exhaust process, there is a probability that impure gas within the atmosphere will enter the interior of the casing 41 through O rings which are interposed between the inlet pipe 60 and the inlet opening 41c, between the exhaust pipe 64 and the opening 30a, and between the valves 61 and 62 and the channels of the pipes, etc., for example.

Further, in the case that an event occurs that causes the exhaust process to be ceased, there is a possibility that impure gas will be generated from organic matter within the casing 41, resulting in deterioration of the line narrowing elements during operation of the narrow band excimer laser apparatus 2.

4. First Embodiment 4.1 Configuration of the First Embodiment

Figure 6:
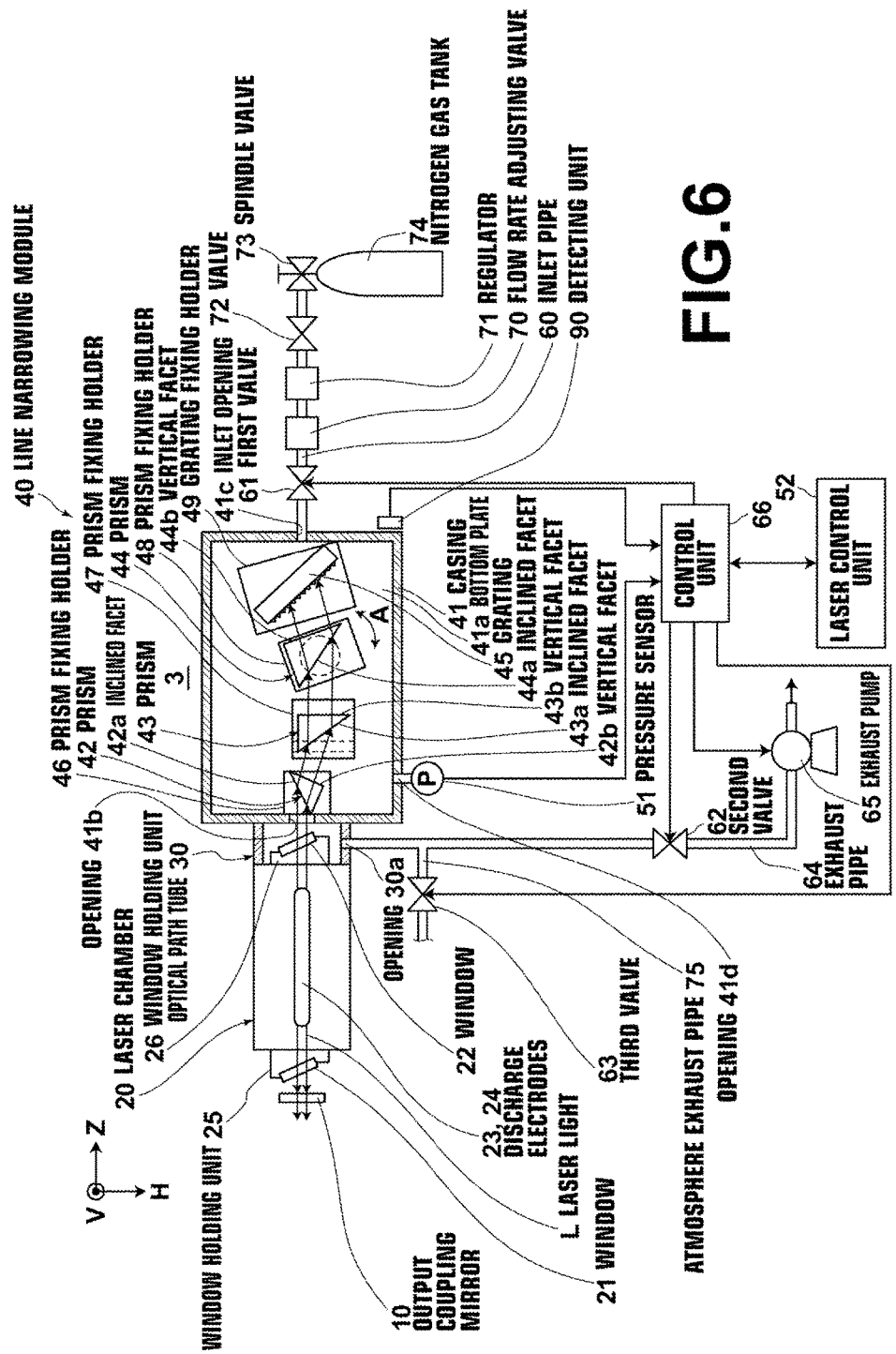
FIG. 6 is a partially cross sectional plan view that illustrates the schematic configuration of a narrow band excimer laser according to a first embodiment.

FIG. 6 is a partially cross sectional plan view that illustrates the schematic configuration of a narrow band excimer laser 3 according to a first embodiment. In the configuration of FIG. 6, constituent elements which are the same as those of the comparative example illustrated in FIG. 5 will be denoted by the same reference numerals, and redundant descriptions will be omitted.

Hereinafter, portions of the configuration of the first embodiment which are different from the configuration of the comparative example will be described. Note that in the first embodiment, the configurations other than the points of difference from the comparative example, to be described below, may be the same as those of the comparative example.

A nitrogen gas tank 74 may be connected to the inlet pipe 60 as a nitrogen gas supply apparatus via a flow rate adjusting valve 70, a pressure adjusting valve, that is, a regulator 71, a valve 72, and a spindle valve 73, which are provided in this order from the side of the first valve 61. The spindle valve 73 may be an accessory of the nitrogen gas tank 74. The valve 72 may be that for cutting off communication between the nitrogen gas tank 74 and the line narrowing module 40.

Meanwhile, an atmosphere exhaust pipe 75 may branch from the exhaust pipe 64 at a position between the optical path tube 30 and the second valve 62. A third valve 63 may be provided in the atmosphere exhaust pipe 75. In addition, a laser control unit 52 may be connected to the control unit 66.

Note that the inlet pipe 60, the flow rate adjusting valve 70, the regulator 71, and the valve 72 may constitute a nitrogen gas introducing unit that causes nitrogen gas which is supplied from the nitrogen gas tank 74 to flow into the casing 41. The first valve 61 may regulate the inflow of nitrogen gas into the casing 41. Nitrogen gas having a purity of 99.999%, etc., may be employed.

In addition, the opening 41b provided in the casing 41, the optical path tube 30, and the exhaust pipe 64 which is in communication with the opening 30a of the optical path tube 30 may constitute an exhaust unit that causes gas within the casing 41 to flow out to the exterior of the casing 41. The exhaust pump 65 may discharge gas within the casing 41 to the exterior of the casing 41 through the exhaust unit. The second valve 62 may regulate the exhausting of gas from the exhaust unit.

The opening 41b provided in the casing 41, the optical path tube 30, the exhaust pipe 64 which is in communication with the opening 30a of the optical path tube 30, and the atmosphere exhaust pipe 75 may constitute an atmosphere exhaust unit that causes gas within the casing 41 to be discharged into the atmosphere. The third valve 63 may regulate the discharge of gas by the atmosphere discharge unit.

The first valve 61, the second valve 62, and the third valve 63 described above may be opened and closed by compressed air, and a type of valve in which the supply and cutoff of compressed air is controlled by electromagnetic valves may be employed. In this case, the operation of the electromagnetic valves may be controlled by the control unit 66. Alternatively, compressed nitrogen gas may be employed instead of compressed air. As another alternative, the first valve 61, the second valve 62, and the third valve 63 may be of a type that is capable of realizing a desired degree of openness. For example, the first valve 61, the second valve 62, and the third valve 63 may be servo valves equipped with servo motors. In this case, the operation of the servo motors may be controlled by the control unit 66.

The control unit 66 may close the second valve 62 while opening the first valve 61 and the third valve 63. As a result, nitrogen gas may be supplied to the interior of the casing 41 for a predetermined amount of time. Following the above supply of nitrogen gas, the control unit 66 may close the first valve 61 and the third valve 63 while opening the second valve 62 and driving the exhaust pump 65. As a result, the interior of the casing 41 may be exhausted. In addition, the control unit 66 may send a drive command to the laser control unit 52 after the casing 41 is exhausted, to cause laser oscillation.

The narrow band excimer laser apparatus 3 may be provided with a detecting unit 90 that detects that a line narrowing module 40 has been installed in the narrow band excimer laser apparatus 3 and outputs a detection signal, for example, a proximity switch or the like. The detection signal may be input to the control unit 66.

4.2 Operation of the First Embodiment

FIG. 7 through FIG. 12 are flow charts that illustrate the flow of processes related to the supply of nitrogen gas in the narrow band excimer laser apparatus 3 of the present embodiment. The operation of the narrow band excimer laser apparatus 3 of the present embodiment will be described hereafter with reference to these drawings as well.

Note that in the flow charts of FIG. 7 through FIG. 12, the first valve 61, the second valve 62, and the third valve 63 are respectively indicated as V1, V2, and V3. The line narrowing module 40 is indicated as LNM, the laser chamber 20 is indicated as CHAMBER, and nitrogen gas is indicated as $N_2$. In addition, in the flow charts, opening operations of any of the valves 61 through 63 are indicated as OPEN, and closing operations thereof are indicated as CLOSE.

Figure 7:
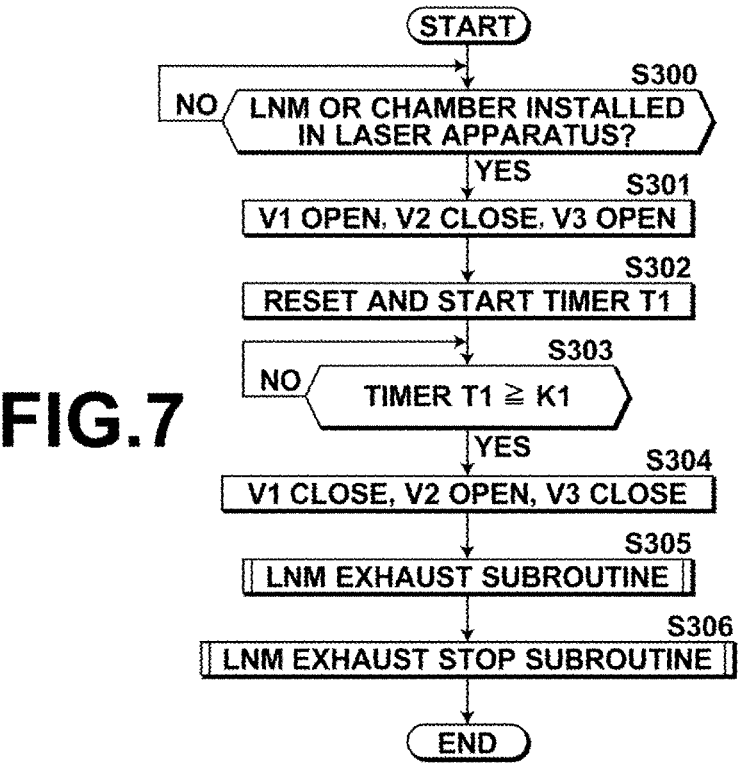
FIG. 7 is a flow chart that illustrates a control process which is performed by a control unit of the first embodiment.

FIG. 7 illustrates the flow of processes from supply of nitrogen gas to the interior of the casing 41 of the line narrowing module 40 through exhaust of the casing 41 as a whole. This process may be executed by the control unit 66. In the process of FIG. 7, whether the line narrowing module 40 or the laser chamber 20 has been installed in the narrow band excimer laser apparatus 3 may be judged first by the control unit 66, at step S300. Specifically, this judgment may be conducted by the detection signal output by the detecting unit 90 illustrated in FIG. 6 being input to the control unit 66 with respect to the line narrowing module 40, for example. As illustrated in FIG. 7, the process of step S300 may be repeatedly executed until it is judged that the line narrowing module 40 or the laser chamber 20 has been installed in the laser apparatus. In the case that it is judged that the line narrowing module 40 or the laser chamber 20 has been installed in the laser apparatus, the control unit 66 may close the second valve 62 while opening the first valve 61 and the third valve 63 at step S301. Thereby, the interior of the casing 41 of the line narrowing module 40 will be purged by nitrogen gas. That is, nitrogen gas which is supplied from the nitrogen gas tank 74 is supplied to the interior of the casing 41 of the line narrowing module 40 via the inlet pipe 60 and the inlet opening 41c. Thereby, gas which was present within the casing 41 is discharged into the atmosphere via the opening 41b, the optical path tube 30, the exhaust pipe 64, and the atmosphere exhaust pipe 75.

Next, at step S302 following operation of the valves 61 through 63, the control unit 66 may reset a built-in timer, which is not illustrated, and initiate measurement of an amount of time T1 following operation of the valves with the timer. Next, at step S303, the control unit 66 may judge whether the amount of time T1 has become a predetermined set amount of time K1 or greater. Note that the set amount of time K1 may be an amount of time within a range from 3 minutes to 10 minutes, for example, and may preferably be approximately 5 minutes. As illustrated in FIG. 7, the process of step S303 may be repeatedly executed until it is judged that the amount of time T1 has become the predetermined amount of time K1 or greater. In the case that it is judged that the amount of time T1 has become the predetermined amount of time K1 or greater, the control unit 66 may close the first valve 61 and the third valve 63 while opening the second valve 62, at step S304.

Next, at step S305, a subroutine process that exhausts the gas within the casing 41 of the line narrowing module 40 with the exhaust pump 65 may be executed. Thereafter, at step S306, a subroutine process that ceases the exhausting of gas from the casing 41 may be executed. Note that these subroutines will be described in detail below.

Figure 8:
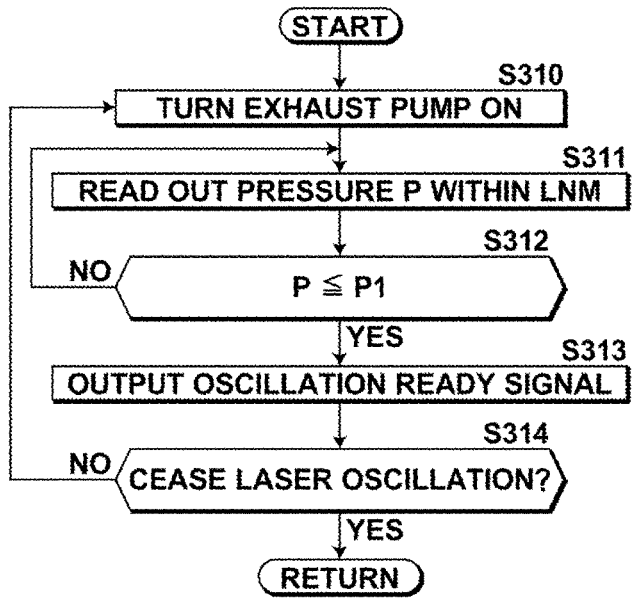
FIG. 8 is a flow chart that illustrates an example of an exhaust subroutine within the control process which is illustrated in FIG. 7.

The subroutine process that exhausts the gas within the casing 41 of the line narrowing module 40 executed at step S305 will be described with reference to FIG. 8. Note that FIG. 8 illustrates a first example of the exhaust subroutine process. In this process, first, the control unit 66 may turn the exhaust pump 65 ON, that is, initiate operation of the exhaust pump 65, at step S310. By the exhaust pump 65 being driven, the gas within the casing 41 of the line narrowing module 40 may be exhausted to the exterior of the casing 41.

Next, at step S311, the control unit 66 may read out the pressure P within the casing 41 indicated by the output signal from the pressure sensor 51. Then, at step S312, the control unit 66 may judge whether the pressure P has decreased to a predetermined pressure P1 or less. In the case that the pressure P is higher than the predetermined pressure P1, the processes of step S311 and subsequent step S312 may be repeated, as illustrated in FIG. 8. Note that the predetermined pressure P1 may be approximately 4 kPa, for example.

In the case that it is judged that the pressure P has decreased to the predetermined pressure P1 or less, the control unit 66 may output a signal indicating that preparation for oscillation is OK, at step S313. This signal may be sent to an exposure apparatus, which is an external apparatus, and a control unit that controls the entirety of the narrow band excimer laser apparatus 3, for example, the laser control unit 52 illustrated in FIG. 6, or the like. The narrowband excimer laser apparatus 3 initiates oscillation by the above signal being sent to the laser control unit 52 or the like.

Next, at step S314, the control unit 66 may judge whether or not laser oscillation is to be ceased for a period of several hours to several days or longer. This judgment may be conducted based on whether a signal indicating cessation of laser oscillation is received by the control unit 66 from the laser control unit 52 of FIG. 6, for example. In the case that it is not judged that laser oscillation is to be ceased, the control unit 66 may return the process to step S310. In the case that it is judged that laser, oscillation is to be ceased, the control unit 66 may move the process to step S306 of FIG. 7.

Figure 12:
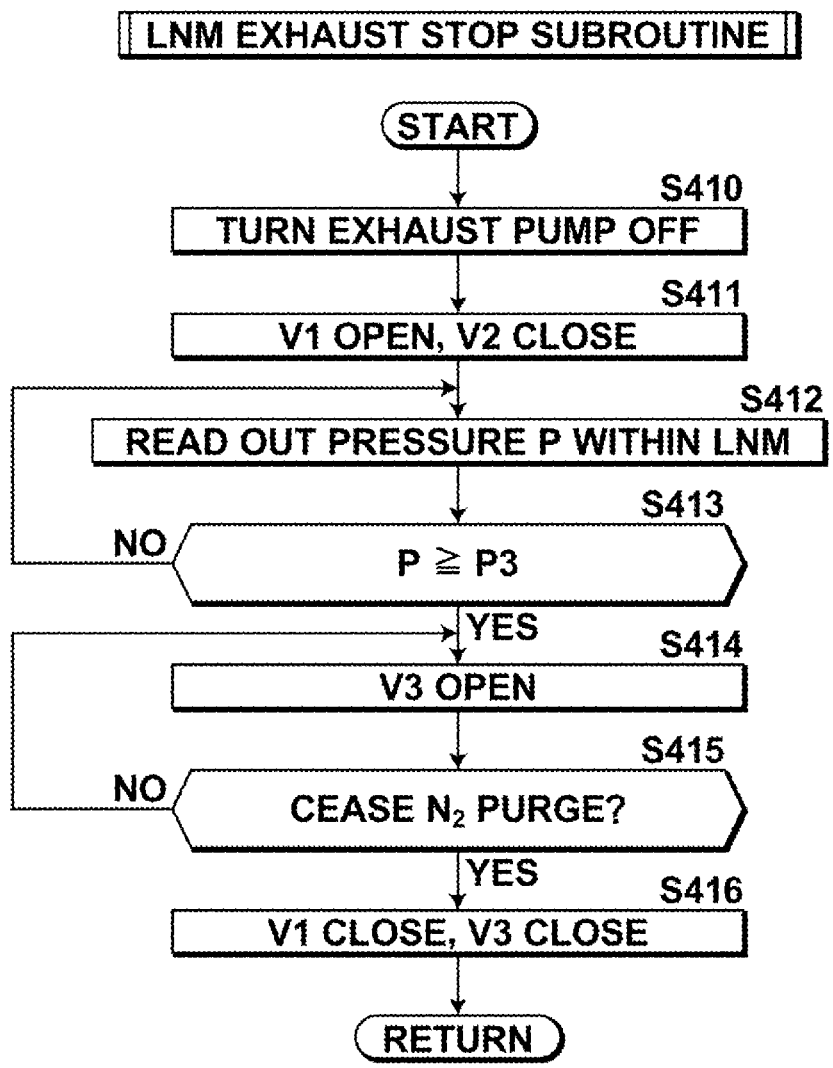
FIG. 12 is a flow chart that illustrates an example of a cease exhaust subroutine within the control process which is illustrated in FIG. 7.

Next, the process of step S306, that is, the subroutine process that ceases the exhausting of gas from the interior of the casing 41, will be described with reference to FIG. 12. First, at step S410, the control unit 66 may cease operation of the exhaust pump 65. Thereby, the exhausting of gas from the interior of the casing 41 may be ceased. Next, at step S411, the control unit 66 may open the first valve 61 which has been closed, and may close the second valve 62 which has been open. Thereby, nitrogen gas which is supplied from the nitrogen gas tank 74 will enter the casing 41 of the line narrowing module 40.

Next, at step S412, the control unit 66 may read out the pressure P within the casing 41 indicated by the output signal from the pressure sensor 51. Then, at step S413, the control unit 66 may judge whether the pressure P has increased to a predetermined pressure P3 or greater. In the case that it is judged that the pressure P is less than the predetermined pressure P3, the processes of step S412 and subsequent step S413 may be repeated. Note that the predetermined pressure P3 may be atmospheric pressure, that is, 101.3 kPa, or a pressure somewhat higher than the pressure within a clean room in which the narrow band excimer laser apparatus 3 is installed. In the case that it is judged that the pressure P is the predetermined pressure P3 or greater, the control unit 66 may open the third valve 63 at step S414. By the third valve 63 being opened, the interior of the casing 41 of the line narrowing module 40 is purged by nitrogen gas. That is, gas within the casing 41, which also includes nitrogen gas, flows out through the third valve 63, and the interior of the casing 41 is filled with nitrogen gas.

Next, at step S415, the control unit 66 may judge whether operation of the narrow band excimer laser apparatus 3 is to be ceased, and purging with nitrogen gas is to be ceased. In the case that it is judged that purging with nitrogen gas is not to be ceased, the control unit 66 may repeat the processes of step S414 and subsequent step S415. In the case that it is judged that the purging with nitrogen gas is to be ceased, the control unit 66 may close the first valve 61 and the third valve 63 which have been open. Next, the control unit 66 may move the process to the flow of FIG. 7, and complete the series of processes illustrated in FIG. 7.

4.3 Functions and Effects of the First Embodiment

As described above, the interior of the casing 41 of the line narrowing module 40 is purged with nitrogen gas for a period of time of approximately 3 to 10 minutes, for example, prior to laser oscillation being performed by the narrow band excimer laser apparatus 3. Therefore, impure gas within the casing 41 is exhausted to the exterior of the casing 41. Thereafter, the pressure P within the casing 41 is decreased to approximately 4 kPa, for example. Therefore, deterioration of the optical performance of the line narrowing module 40 due to impure gas within the atmosphere or impure gas generated from within the casing 41 becoming adhered to the line narrowing optical elements within the casing 41 can be suppressed.

Further, in the present embodiment, the interior of the casing 41 is filled with nitrogen gas until the pressure within the casing 41 becomes atmospheric pressure after laser oscillation is ceased and operation of the exhaust pump 65 is ceased. Particularly in the case that the operation of the narrow band excimer laser apparatus 3 is to be ceased for a long period of time, the third valve 63 is opened after the pressure within the casing 41 becomes atmospheric pressure. Therefore, entry of impure gas into the casing 41 from the atmosphere can be suppressed.

In addition, in the case that the line narrowing module 40 is removed from the narrow band excimer laser apparatus 3 as well, the state in which the interior of the casing 41 is filled with nitrogen gas at atmospheric pressure is maintained. Therefore, entry of impure gas into the casing 41 from the atmosphere can be suppressed. Accordingly, deterioration of the optical performance of the line narrowing module 40 due to impure gas within the atmosphere becoming adhered to the line narrowing optical elements within the casing 41 can be suppressed, even in a state in which exhausting of gas from the casing 41 is ceased.

4.4 Supplementary Examples of Operation of the First Embodiment

Next, three other examples of the process of step S305 illustrated in FIG. 7, that is, the exhaust subroutine process for exhausting the line narrow module 40, will be described with reference to FIG. 9 through FIG. 11. The exhaust subroutine process of FIG. 8 enables laser oscillation by the pressure P within the casing 41 being the predetermined pressure P1 or less. In contrast, these three other exhaust subroutine processes enable laser oscillation by setting the pressure P within the casing 41 to be between predetermined pressures P1 and P2.

Figure 9:
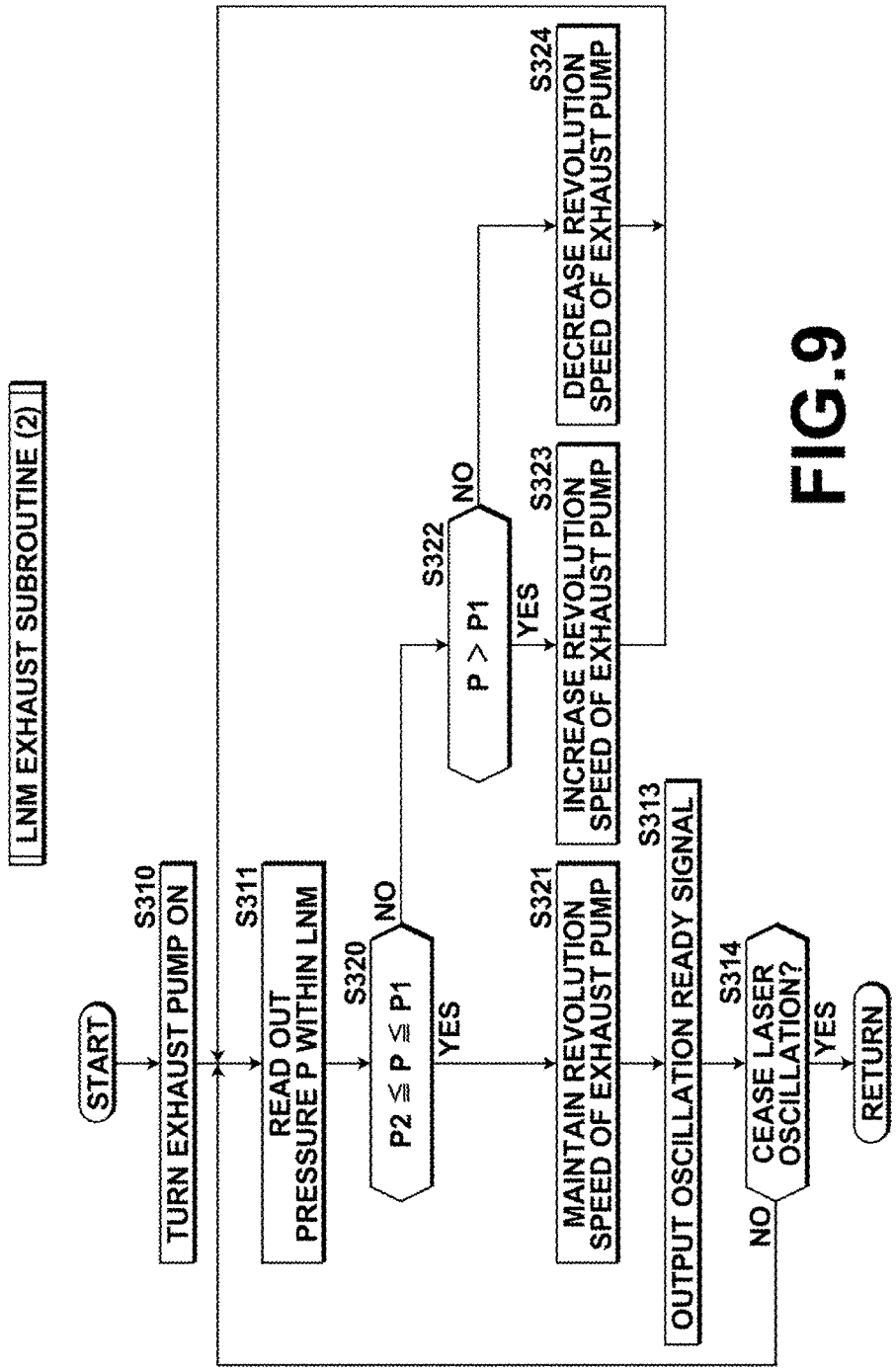
FIG. 9 is a flow chart that illustrates another example of an exhaust subroutine within the control process which is illustrated in FIG. 7.

The process illustrated in FIG. 9 is a second example of the exhaust subroutine process. In the exhaust subroutine process illustrated in FIG. 9, the processes of steps S320 through S324 are executed instead of step S312 illustrated in FIG. 8. The processes of the other steps may be the same as those of the process of FIG. 8.

In the exhaust subroutine process of FIG. 9, the control unit 66 may read out the pressure P within the casing 41 indicated by the output signal from the pressure sensor 51 at step S311, in the same manner as in the process of FIG. 8. Next, at step S320, the control unit 66 may judge whether the pressure P within the casing 41 is between predetermined pressures P1 and P2. In this case, the predetermined pressure P1 may be approximately 4 kPa, and the predetermined pressure P2 may be approximately 2.3 kPa. Note that these examples for the predetermined pressures P1 and P2 may be applied to the exhaust subroutine process of FIG. 10 and the exhaust subroutine process of FIG. 11 to be described below.

In the case that the pressure P within the casing 41 is between the pressures P1 and P2, the revolution speed of the exhaust pump 65 may be maintained as is, at step S321. Note that the revolution speed of the exhaust pump 65 corresponds to the speed of exhaust by the exhaust pump 65. Thereafter, processes which are the same as those of step S313 and step S314 in the process of FIG. 8 may be executed.

In the case that it is judged that the pressure P within the casing 41 is outside the range between the pressures P1 and P2 at step S320, the control unit 66 may judge whether the pressure P is greater than the pressure P1 at step S322. In the case that it is judged that the pressure P is greater than the pressure P1, the control unit 66 may increase the revolution speed of the exhaust pump 65, at step S323. Meanwhile, in the case that it is judged that the pressure P is not greater than the pressure P1, the control unit 66 may decrease the revolution speed of the exhaust pump 65, at step S324. Following step S323 or step S324, the control unit 66 may return the process to step S311. By the processes of steps 320 through S324 being executed, the pressure P within the casing 41 will be set between the predetermined pressures P1 and P2.

Figure 10:
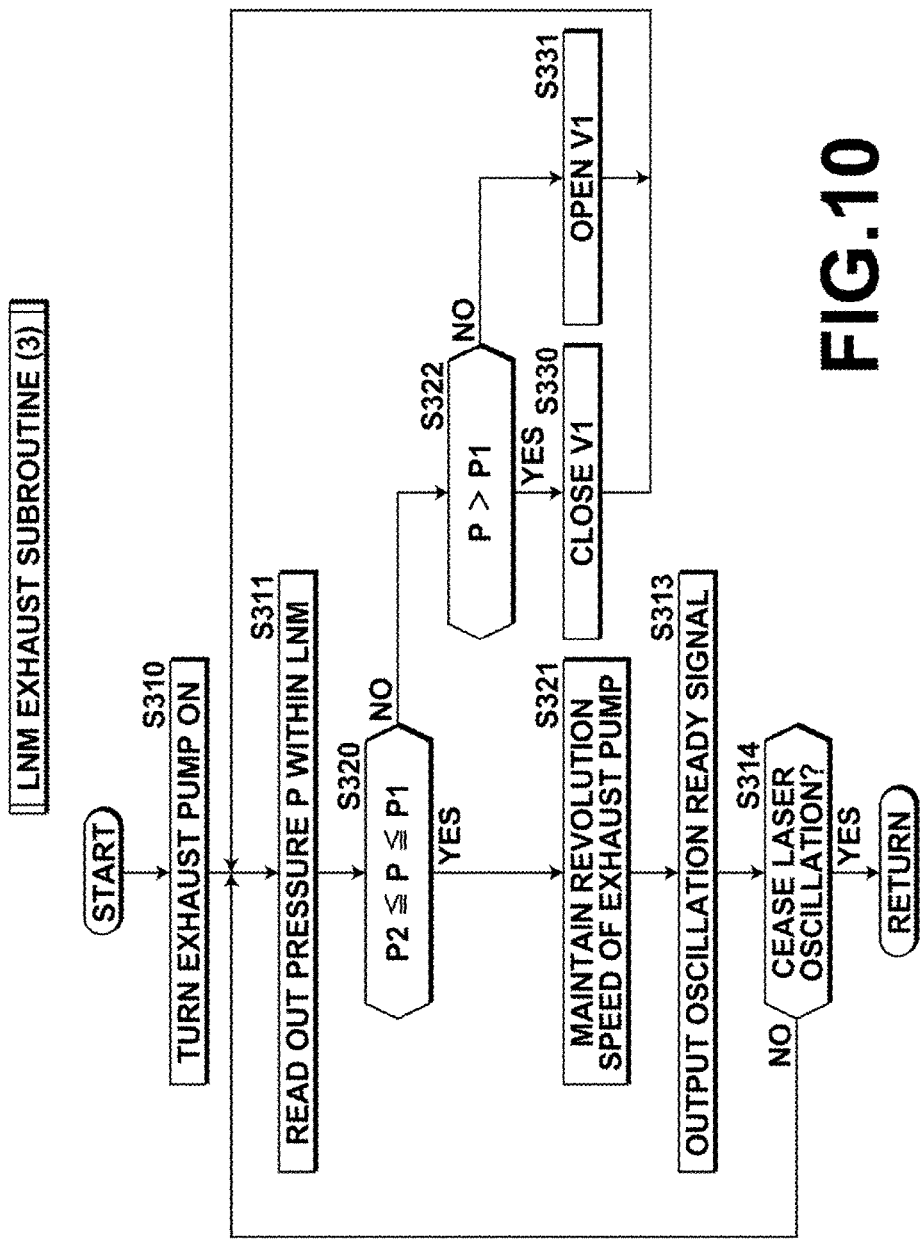
FIG. 10 is a flow chart that illustrates still another example of an exhaust subroutine within the control process which is illustrated in FIG. 7.

Next, the process illustrated in FIG. 10 is a third example of the exhaust subroutine process. In the exhaust subroutine process illustrated in FIG. 10, the processes of steps S330 and S331 are executed instead of step S323 and step S324 illustrated in FIG. 9. The processes of the other steps may be the same as those of the process of FIG. 9.

In the process of FIG. 10, in the case that it is judged that the pressure P is greater than the pressure P1 at step S322, the control unit 66 may close the first valve 61 by a predetermined degree, at step S330. Meanwhile, in the case that it is judged that the pressure P is not greater than the pressure P1, the control unit 66 may open the first valve 61 by a predetermined degree, at step S331. Following step S330 or step S331, the control unit 66 may return the process to step S311. By the processes described above being executed, the pressure P within the casing 41 will be set between the predetermined pressures P1 and P2.

Figure 11:
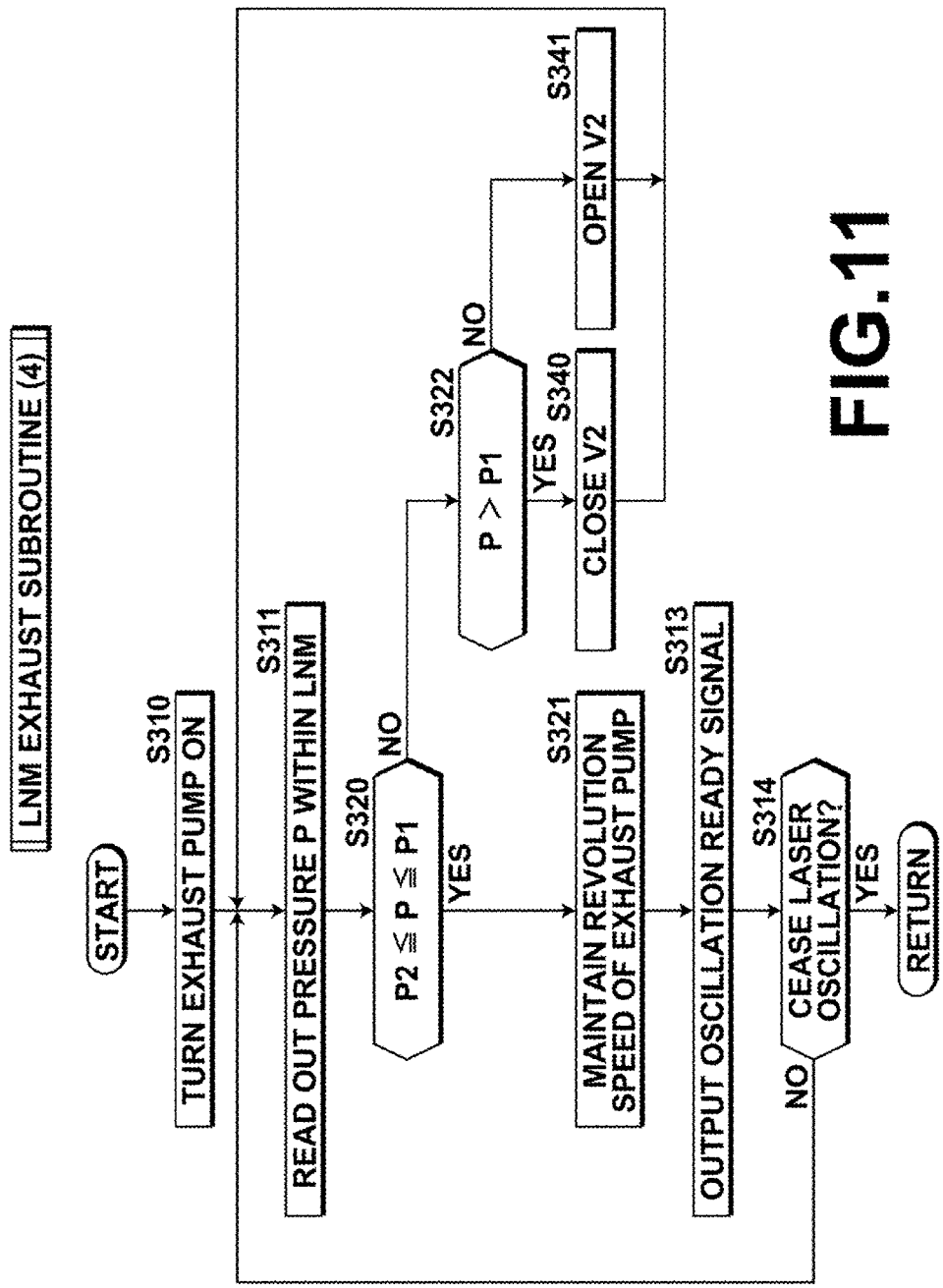
FIG. 11 is a flow chart that illustrates still yet another example of an exhaust subroutine within the control process which is illustrated in FIG. 7.

Next, the process illustrated in FIG. 11 is a fourth example of the exhaust subroutine process. In the exhaust subroutine process illustrated in FIG. 11, the processes of steps S340 and S341 are respectively executed instead of step S330 and step S331 illustrated in FIG. 10. The processes of the other steps may be the same as those of the process of FIG. 10.

In the process of FIG. 11, in the case that it is judged that the pressure P is greater than the pressure P1 at step S322, the control unit 66 may close the second valve 62 by a predetermined degree, at step S340. Meanwhile, in the case that it is judged that the pressure P is not greater than the pressure P1, the control unit 66 may open the second valve 62 by a predetermined degree, at step S341. Following step S340 or step S341, the control unit 66 may return the process to step S311. By the processes described above being executed, the pressure P within the casing 41 will be set between the predetermined pressures P1 and P2.

5. Second Embodiment

5.1 Configuration of the Second Embodiment

Figure 13:
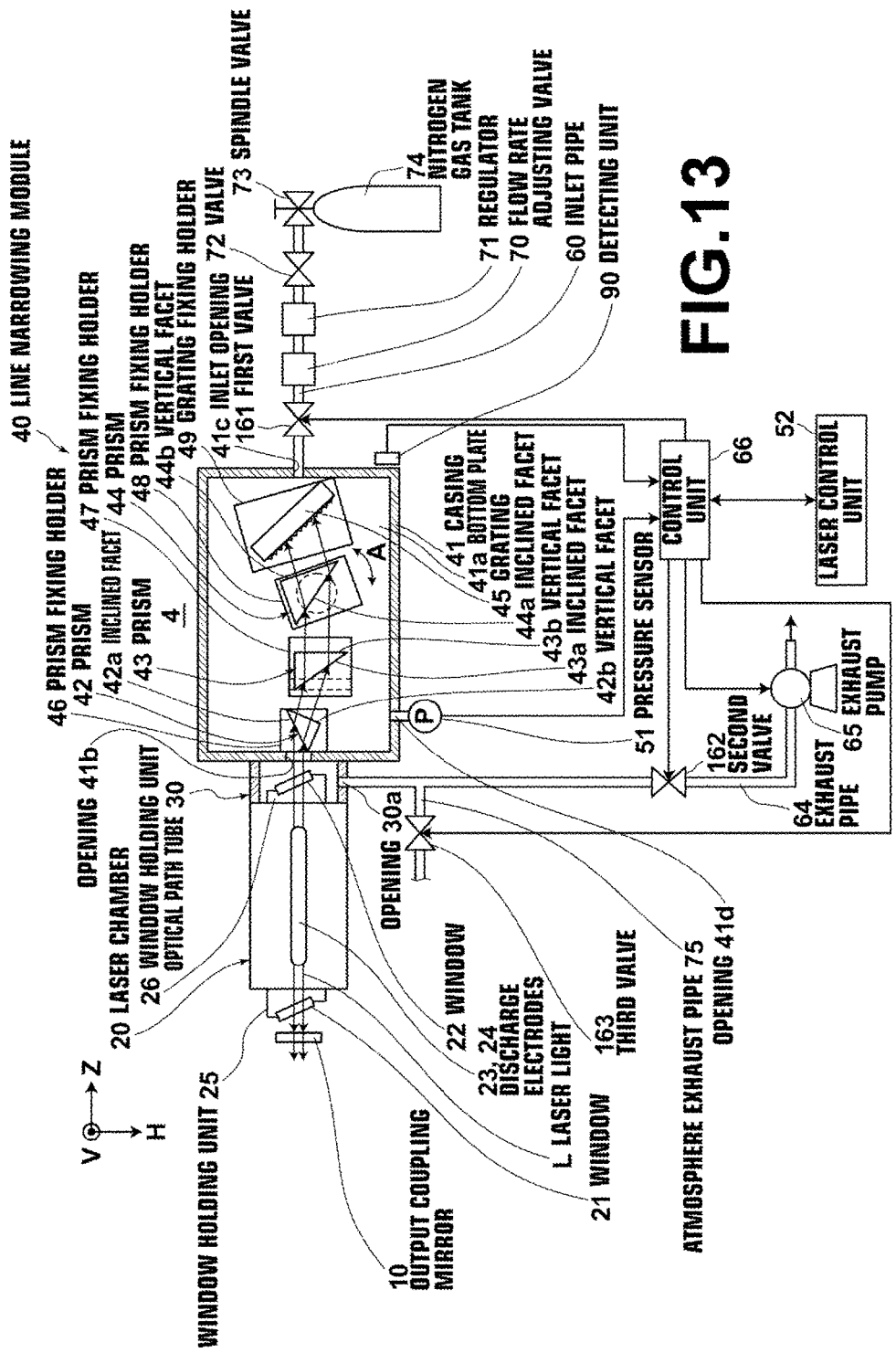
FIG. 13 is a partially cross sectional plan view that schematically illustrates the configuration of a narrow band excimer laser apparatus according to a second embodiment.

FIG. 13 is a partially cross sectional plan view that schematically illustrates the configuration of a narrow band excimer laser apparatus 4 according to a second embodiment. In the configuration of FIG. 13, constituent elements which are the same as those of the first embodiment illustrated in FIG. 6 will be denoted by the same reference numerals, and redundant descriptions will be omitted.

Hereinafter, portions of the configuration of the second embodiment which are different from the configuration of the first embodiment will be described. Note that in the second embodiment, the configurations other than the points of difference from the first embodiment, to be described below, may be the same as those of the first embodiment.

In the present embodiment, a normally open type valve, that is, a valve which is in a closed state only when current is applied, may be employed as a first valve 161. Meanwhile, normally closed type valves, that is, valves which are in an open state only when current is applied, may be employed as a second valve 162 and a third valve 163.

5.2 Operation of the Second Embodiment

In the above configuration, the first valve 161 will automatically be in an open state while the second valve 162 and the third valve 163 will automatically be in a closed state in the case that operation of the narrow band excimer laser apparatus 4 undergoes an emergency stop and operation of the exhaust pump 65 is ceased.

5.3 Functions and Effects of the Second Embodiment

Therefore, nitrogen gas will automatically fill the interior of the casing 41. Thereby, deterioration of the optical performance of the line narrowing module 40 due to impure gas which is generated within the casing 41 becoming adhered to the line narrowing optical elements within the casing 41, that is, the prisms 42 through 44 and the grating 45, can be suppressed.

5.4 Supplementary Example of Operation of the Second Embodiment

In the case that a valve 72 which is provided in series with the first valve 161 with respect to the inlet pipe 60 as illustrated in FIG. 13 is a normally open type valve, a normally open type valve may be employed as the third valve 163. If this configuration is adopted, the first valve 161, the third valve 163, and the valve 72 will automatically be in an open state and the second valve 162 will automatically be in a closed state, in the case that operation of the exhaust pump 65 is ceased.

Thereby, the interior of the casing 41 of the line narrowing module 40 will continuously be purged with nitrogen gas, and an increase of impure gas within the casing 41 can be suppressed.

6. Modification of the Second Embodiment

6.1 Configuration of the Modification of the Second Embodiment

Figure 14:
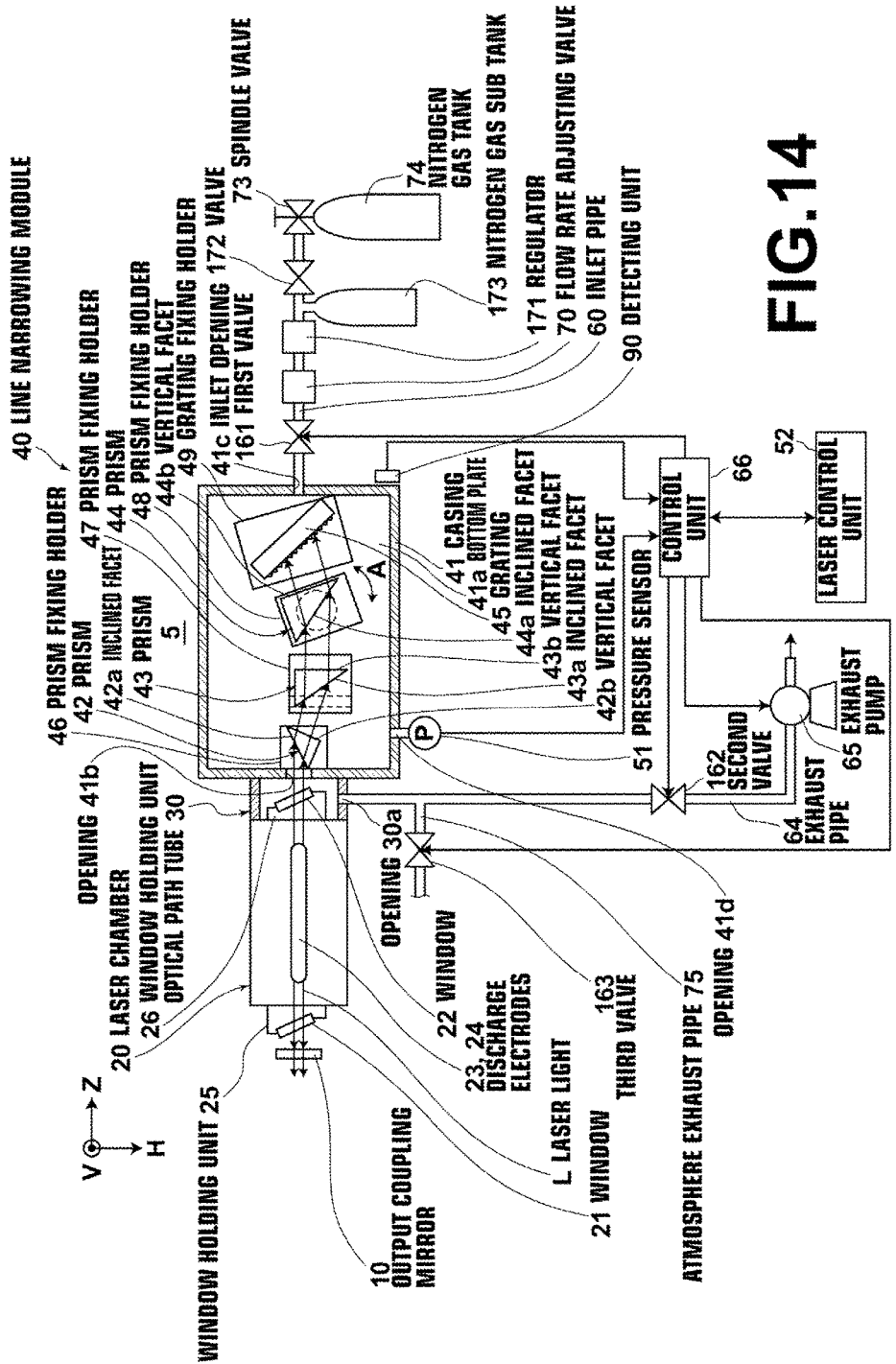
FIG. 14 is a partially cross sectional plan view that schematically illustrates the configuration of a modification of a narrow band excimer laser apparatus according to the second embodiment.

FIG. 14 is a partially cross sectional plan view that schematically illustrates the configuration of a narrow band excimer laser apparatus 5 according to a modification of the second embodiment. In the configuration of FIG. 14, constituent elements which are the same as those of the second embodiment illustrated in FIG. 13 will be denoted by the same reference numerals, and redundant descriptions will be omitted.

Hereinafter, portions of the configuration of the modification of the second embodiment which are different from the configuration of the second embodiment will be described. Note that in the modification of second embodiment, the configurations other than the points of difference from the second embodiment, to be described below, may be the same as those of the second embodiment.

In the modification of the second embodiment, a nitrogen gas sub tank 173 may be connected to the inlet pipe 60 between a regulator 171 and a valve 172. A normally closed type of valve may be employed as the valve 172.

6.2 Operation of the Modification of the Second Embodiment

In the above configuration, the first valve 161 will automatically be in an open state, while the valve 172, the second valve 162, and the third valve 163 will automatically be in a closed state in the case that operation of the narrow band excimer laser apparatus 4 undergoes an emergency stop and operation of the exhaust pump 65 is ceased.

6.3 Functions and Effects of the Modification of the Second Embodiment

By the above operation, nitrogen gas from the nitrogen gas sub tank 173 will automatically fill the interior of the casing 41. Thereby, deterioration of the optical performance of the line narrowing module 40 due to impure gas which is generated within the casing 41 becoming adhered to the line narrowing optical elements within the casing 41, that is, the prisms 42 through 44 and the grating 45, can be suppressed.

7. Third Embodiment 7.1 Configuration of the Third Embodiment

Figure 15:
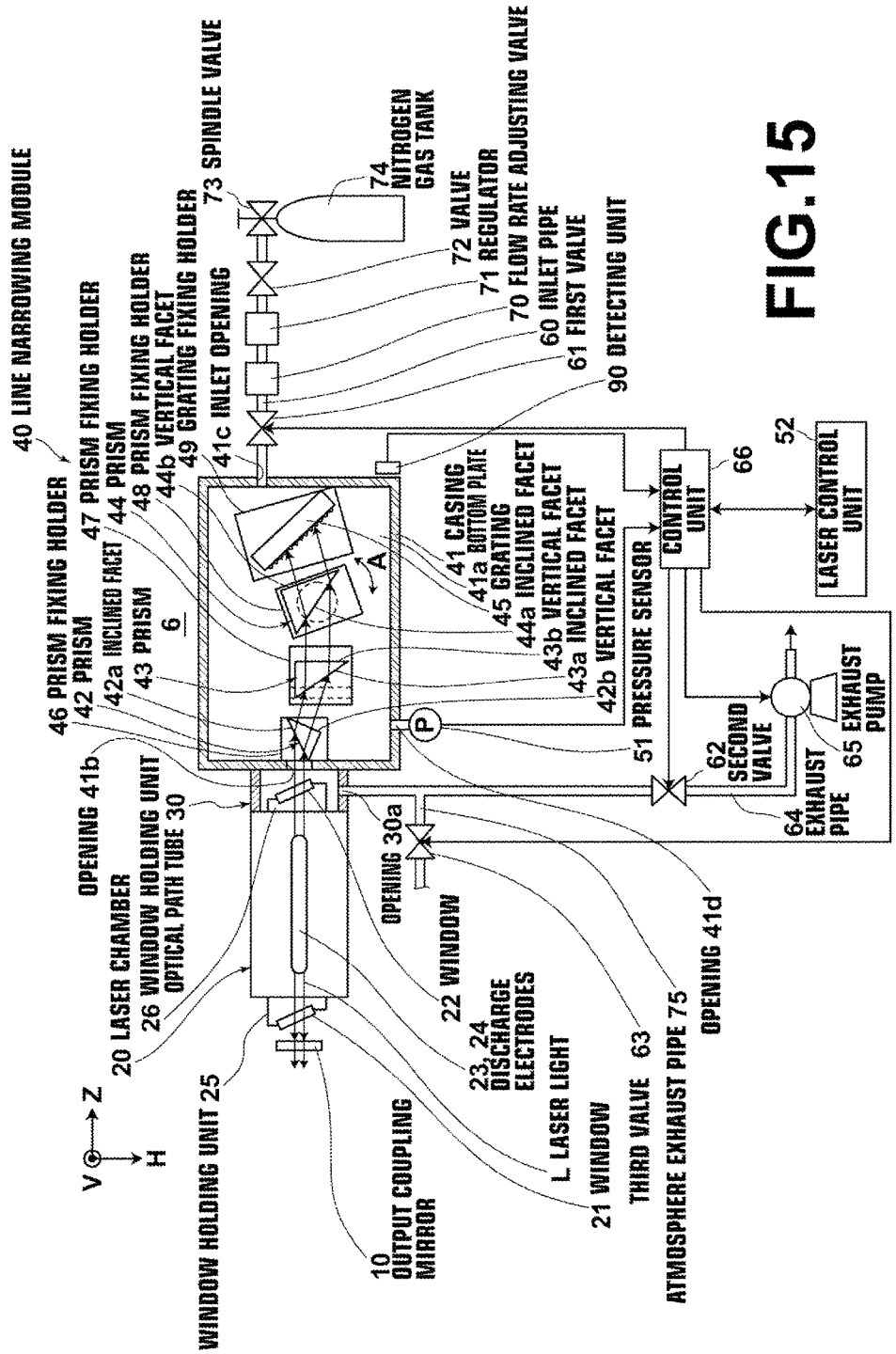
FIG. 15 is a partially cross sectional plan view that schematically illustrates the configuration of a narrow band excimer laser apparatus according to a third embodiment.

FIG. 15 is a partially cross sectional plan view that schematically illustrates the configuration of a narrow band excimer laser apparatus 6 according to a third embodiment. In the configuration of FIG. 15, constituent elements which are the same as those of the second embodiment illustrated in FIG. 13 will be denoted by the same reference numerals, and redundant descriptions will be omitted.

Hereinafter, portions of the configuration of the third embodiment which are different from the configuration of the second embodiment will be described. Note that in the third embodiment, the configurations other than the points of difference from the second embodiment, to be described below, may be the same as those of the second embodiment.

In the third embodiment, the first valve 61, which is not of the normally open type, may be employed in the same manner as in the first embodiment illustrated in FIG. 6. In addition, the position of the inlet opening 41c of the casing 41 may be changed to a position such that nitrogen gas will be introduced in the vicinity of the central portion of the back surface of the grating 45. In addition, in the case that gas within the casing 41 is exhausted while purging the interior of the casing 41 with nitrogen gas, it is preferable for the position of the opening 41b, which functions as an exhaust port, and the position of the inlet opening 41c to be farther apart. Therefore, the position of the opening 41b may be changed to be toward the vicinity of the end portion of the window 22.

7.2 Operation of the Third Embodiment.

Figure 16:
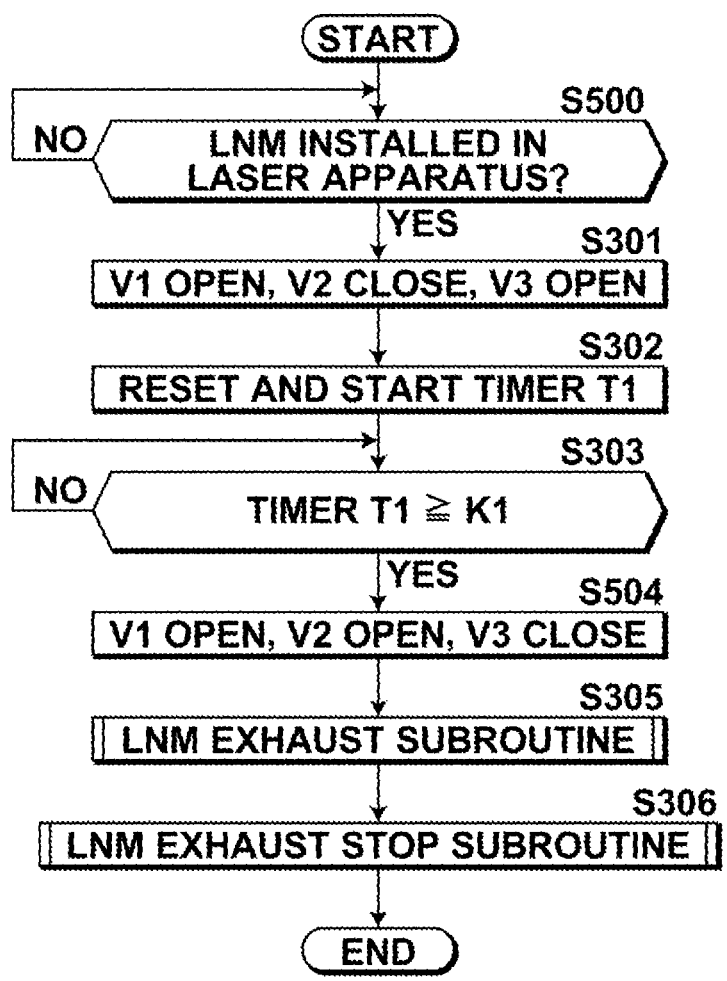
FIG. 16 is a flow chart that illustrates a control process which is performed by a control unit of the third embodiment.

FIG. 16 illustrates the flow of the entirety of a series of processes from supply of nitrogen gas to the interior of the casing 41 of the line narrowing module 40 through exhaust of gas from within the casing 41. In FIG. 16, processes which are the same as those of the process of FIG. 7 are denoted with the same step numbers as the step numbers in FIG. 7. Here, first, at step S500 whether the line narrowing module 40 has been installed in a laser apparatus, which is not illustrated, may be judged by the control unit 66. The processes of steps S301 through S303 following thereafter may be the same as the processes of FIG. 7. At step S504, the first valve 61 and the second valve 162 may be opened while the third valve 163 may be closed. The processes of steps S305 and S306 thereafter may also be the same as the processes of FIG. 7.

As described above, the first valve 61 and the second valve 162 may be opened and the third valve 163 may be closed to exhaust gas from within the casing 41 with the exhaust pump 65 while purging the interior of the casing 41 with nitrogen gas. During this exhausting process, because the positions of the opening 41b and the inlet opening 41c are as described above, the flow path of nitrogen gas through the interior of the casing 41 will be that in which the flow of nitrogen gas onto the surface of the grating 45 will be weakened.

7.3 Functions and Effects of the Third Embodiment

As described above, by exhausting the interior of the casing 41 while purging with nitrogen gas, deterioration of the optical performance of the line narrowing module 40 due to impure gas generated from within the casing 41 becoming adhered to the line narrowing optical elements within the casing 41 can be suppressed, in the case that the interior of the casing 41 is depressurized. In addition, the flow of gas onto the surface of the grating 45 is weakened. Therefore, fluctuations in refractive index due to a density distribution of nitrogen gas or due to a temperature distribution on the surface of the grating 45 can be suppressed. Therefore, the line narrowing of the laser light L being inhibited by the fluctuations in refractive index can be suppressed. In addition, impure gas that enters the interior of the casing 41 from the exterior is exhausted along with the nitrogen gas. Therefore, the concentration of impure gas within the casing 41 can be decreased.

8. Fourth Embodiment 8.1 Configuration of the Fourth Embodiment

Figure 17:
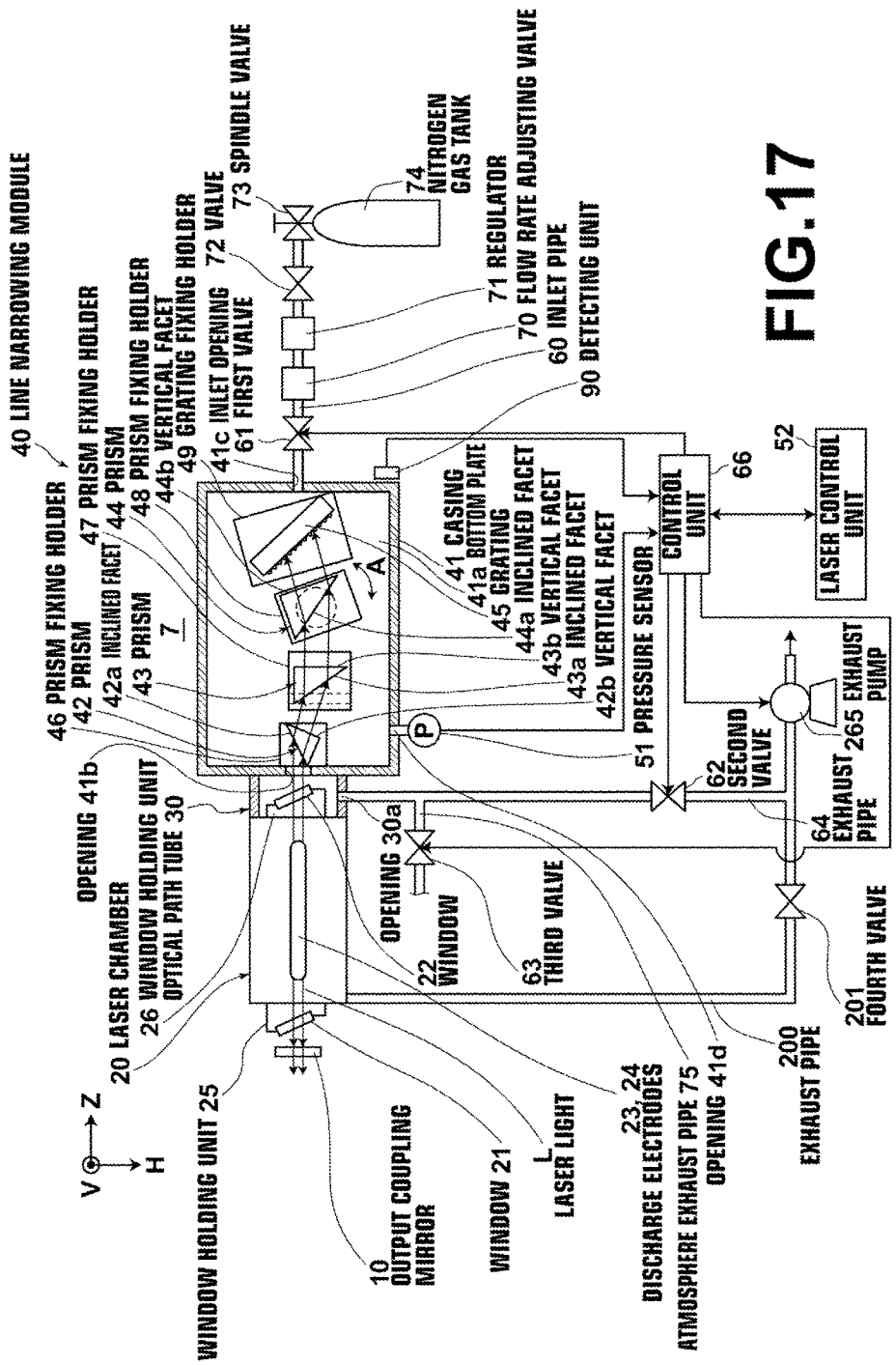
FIG. 17 is a partially cross sectional plan view that schematically illustrates the configuration of a narrow band excimer laser apparatus according to a fourth embodiment.

FIG. 17 is a partially cross sectional plan view that schematically illustrates the configuration of a narrow band excimer laser apparatus 7 according to a fourth embodiment. In the configuration of FIG. 17, constituent elements which are the same as those of the first embodiment illustrated in FIG. 6 will be denoted by the same reference numerals, and redundant descriptions will be omitted.

Hereinafter, portions of the configuration of the fourth embodiment which are different from the configuration of the first embodiment will be described. Note that in the fourth embodiment, the configurations other than the points of difference from the first embodiment, to be described below, may be the same as those of the first embodiment.

In the present embodiment, one end of an exhaust pipe 200 may be in communication with the exhaust pipe 64 at a position between the first valve 61 and an exhaust pump 265. The other end of the exhaust pipe 200 may be in communication with the interior of the laser chamber 20. A fourth valve 201 may be provided in the exhaust pipe 200. In addition, in the present embodiment, a dry pump may be employed as the exhaust pump 265. In the above configuration, the exhaust pump 265 that exhausts the interior of the casing 41 of the line narrowing module 40 is also employed to exhaust the interior of the laser chamber 20.

8.2 Operation of the Fourth Embodiment

Figure 18:
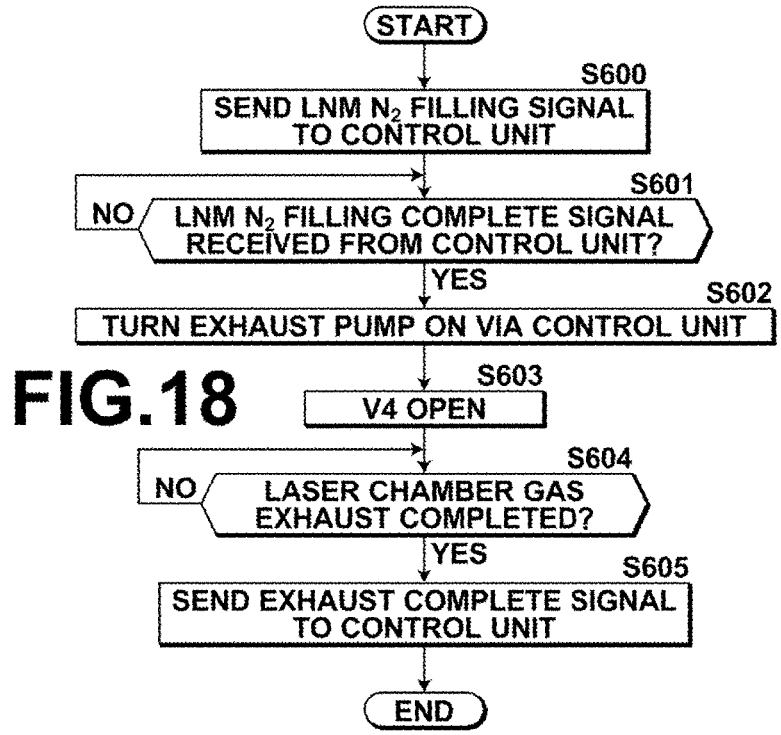
FIG. 18 is a flow chart that illustrates a control process which is performed by a laser control unit of the fourth embodiment.

FIG. 18 is a flow chart that illustrates the flow of control processes which are executed by the laser control unit 52 illustrated in FIG. 17. Hereinafter, the above control processes will be described with reference to FIG. 18. First, at step S600, the laser control unit 52 may send a signal that indicates that the casing 41 of the line narrowing module 40 is to be filled with nitrogen gas to the control unit 66. When the interior of the casing 41 is filled with nitrogen gas, the control unit 66 may send a signal that indicates that the filling has been completed to the laser control unit 52. At step S601, the laser control unit 52 may judge whether a filling complete signal has been received. In the case that it is not judged that the filling complete signal has been received, the process of step S601 may be repeated.

In the case that it is judged that a filling complete signal has been received, the laser control unit 52 may initiate operation of the exhaust pump 265 via the control unit 66, at step S602. Next, the laser control unit 52 may open the fourth valve 201 at step S603. Thereby, laser gas within the laser chamber 20 is discharged to the exterior of the laser chamber 20 via a halogen filter, which is not illustrated.

Next, the laser control unit 52 may judge whether exhaust of laser gas from the laser chamber 20 has been completed, at step S604. In the case that it is not judged that the exhaust of laser gas has been completed, the process of step S604 may be repeated. In the case that it is judged that the exhaust of laser gas from the laser chamber 20 has been completed, the laser control unit 52 may send a signal that indicates completion of exhaust of laser gas to the control unit 66, at step S605. At this time, the laser control unit 52 may close the fourth valve 201. In the case that this signal is received, the control unit 66 may exhaust the nitrogen gas that fills the casing 41 of the line narrowing module 40 with the exhaust pump 265.

Figure 19:
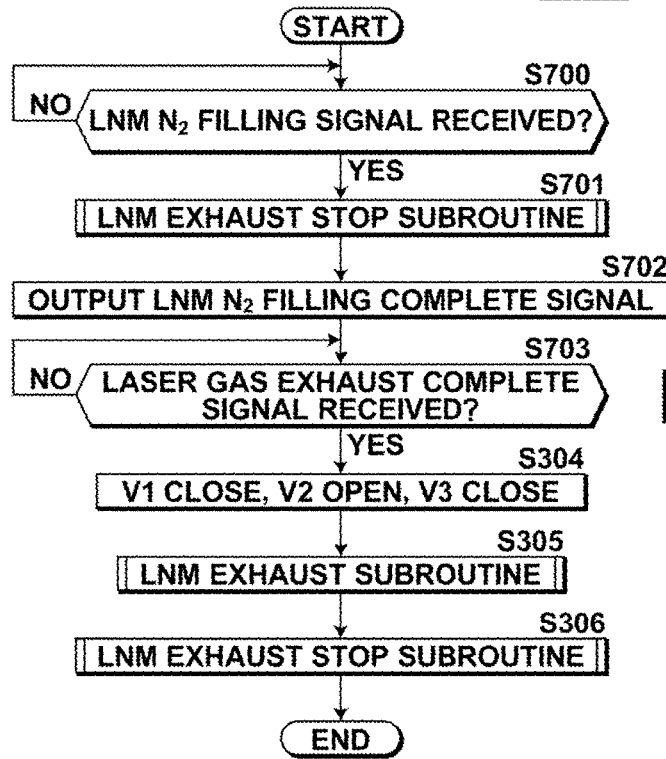
FIG. 19 is a flow chart that illustrates a control process which is performed by a control unit of the fourth embodiment.

In addition, FIG. 19 is a flow chart that illustrates the flow of processes which are executed by the control unit 66 while the processes by the laser control unit 52 are progressing. Hereinafter, the processes executed by the control unit 66 will be described with reference to FIG. 19. First, at step S700, the control unit 66 may judge whether a filling complete signal that indicates that the interior of the casing 41 of the line narrowing module 40 has been filled with nitrogen gas has been received from the laser control unit 52. In the case that it is not judged that the filling complete signal has been received, the process of step S700 may be repeated.

In the case that it is judged that a filling complete signal has been received, the control unit 66 may execute a subroutine process that ceases exhausting of gas from the casing 41 of the line narrowing module 40, at step S701. The exhausting ceasing subroutine process may be the same process as that illustrated in FIG. 12. Next, the control unit 66 may output a filling complete signal that indicates that the interior of the casing 41 has been filled with nitrogen gas, and send the filling complete signal to the laser control unit 52, at step S702. This filling complete signal may be that with which whether it has been received is judged at step S601 in the process illustrated in FIG. 18.

Next, at step S703, the control unit 66 may judge whether an exhaust complete signal that indicates that exhaust of laser gas from the laser chamber 20 has been completed has been received. This exhaust complete signal may be that which is sent to the control unit 66 at step S605 in the process illustrated in FIG. 18.

8.3 Functions and Effects of the Fourth Embodiment

As described above, in the present embodiment, the one exhaust pump 265 performs both exhausting of laser gas from the laser chamber 20 and exhausting of gas from the casing 41 of the line narrowing module 40. Because the laser gas is exhausted from the laser chamber 20 in a state in which the casing 41 is filled with nitrogen gas, contamination of the interior of the casing 41 of the line narrowing module 40 by impurities which are present in the laser gas can be suppressed.

9. Control Unit 9.1 Configuration of Control Unit

Figure 20:
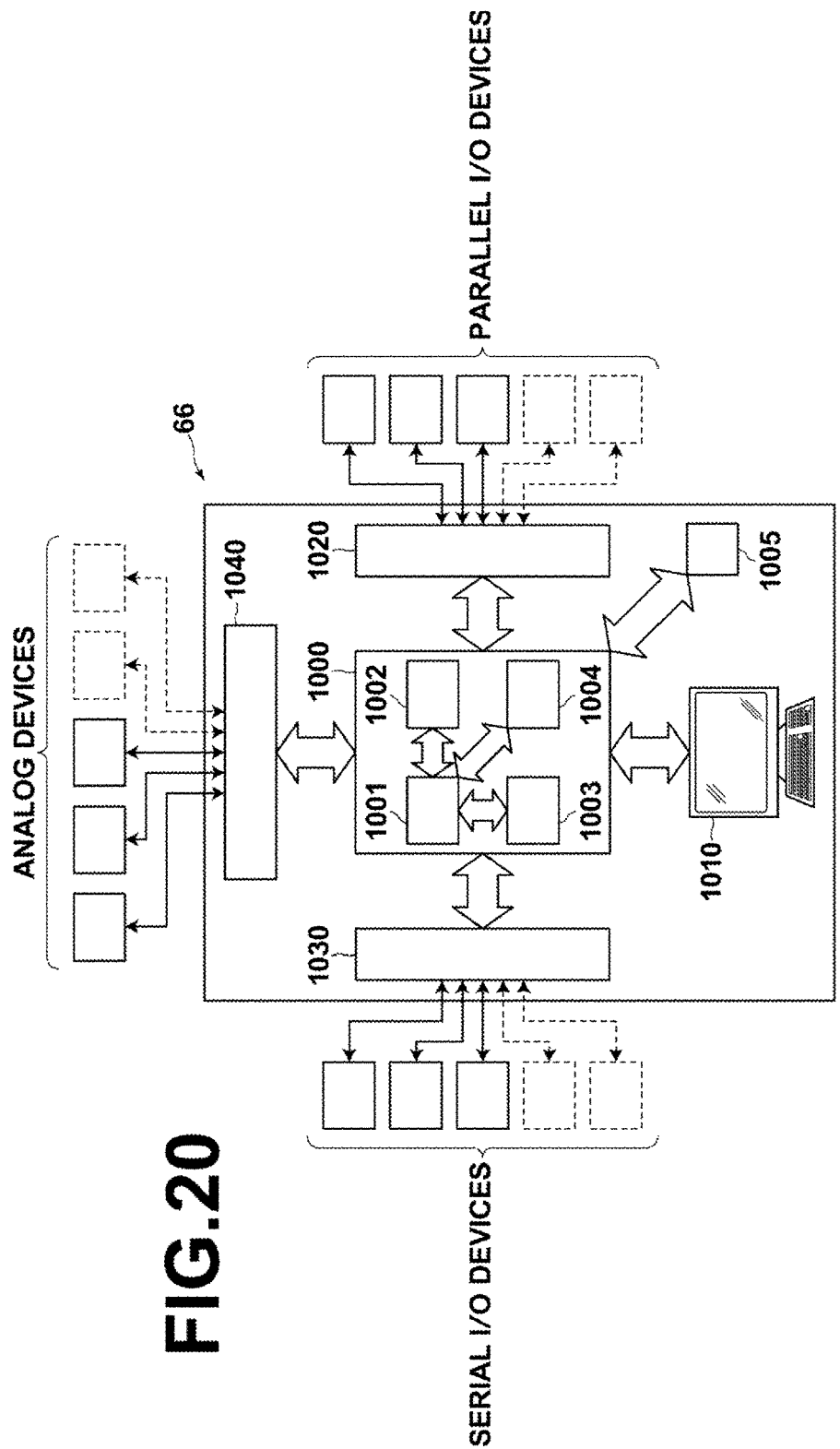
FIG. 20 is a block diagram that schematically illustrates the configuration of the control unit.

FIG. 20 is a block diagram that schematically illustrates the configuration of the control unit 66 of each of the embodiments described above. Hereinafter, the configuration of the control unit 66 will be described with reference to FIG. 20. The control unit 66 may be constituted by a general use control device such as a computer or a programmable controller. For example, the control unit 66 may be configured as described below and as illustrated in FIG. 20.

The control unit 66 may be constituted by processing unit 1000, as well as a storage memory 1005, a user interface 1010, a parallel I/O controller 1020, a serial I/O controller 1030, and an A/D, D/A converter 1040, which are connected to the processing unit 1000. In addition, the processing unit 1000 may be constituted by a CPU 1001, a memory 1002, a timer 1003, and a GPU 1004, which are connected to the CPU 1001.

9.2 Functions of the Control Unit

Table 1 schematically illustrates the functions of devices illustrated in FIG. 20. Hereinafter, the functions of the control unit 66 will be described with reference to Table 1.

TABLE 1

| Reference Number | Device | Schematic Function |
|---|---|---|
| 100 | Hardware Environment | |
| 1001 | CPU | Performs various operations |
| 1002 | Memory | Temporary storage for operations |
| 1003 | Timer | Measures time |
| 1004 | GPU | Performs image processing |
| 1005 | Storage Unit | Stores programs and data in readable format |
| 1010 | User Interface | Enables humans to confirm operating states and perform data input as necessary |
| 1000 | Processing Unit | Executes programs |
| 1020 | Parallel I/O Controller | Inputs and outputs signals to and from parallel I/O devices |
| 1030 | Serial I/O Controller | Inputs and outputs signals to and from serial I/O devices |
| 1040 | A/D, D/A Converter | Inputs and outputs signals to and from analog input/output devices |
| None | Parallel I/O Devices | Laser control unit, other control units, etc. |
| None | Serial I/O Devices | Automatically rotating stage, etc. |
| None | Analog Devices | Pressure sensor, other various sensors, etc. |

The processing unit 1000 may read out programs which are stored in the storage unit 1005. In addition, the processing unit 1000 may execute the read out programs, read out data from the storage unit 1005 according to the execution of the programs, and store data in the storage unit 1005.

The parallel I/O controller 1020 may be connected to devices which are capable of communicating via a parallel I/O port. The parallel I/O controller 1020 may control communications by digital signals via the parallel I/O port which are performed for processes during execution of programs by the processing unit 1000.

The serial I/O controller 1030 may be connected to devices which are capable of communicating via a serial I/O port. The serial I/O controller 1030 may control communications by digital signals via the serial I/O port which are performed for processes during execution of programs by the processing unit 1000.

The A/D, D/A converter 1040 may be connected to devices which are capable of communicating via an analog port. The A/D, D/A converter 1040 may control communications by analog signals via the analog port which are performed for processes during execution of programs by the processing unit 1000.

The user interface 1010 may be configured to display the progress of programs which are being executed by the processing unit 1000 to an operator, and to enable the operator to command the processing unit 1000 to cease executing programs or to execute interruption routines.

The CPU 1001 of the processing unit 1000 may execute calculation processes of programs. The memory 1002 may temporarily store programs during execution of the programs by the CPU 1001 and temporarily store data during the execution of calculation processes. The timer 1003 may measure the time or elapsed time, and may output the measured time or measured elapsed time to the CPU 1001 according to the execution of programs. The GPU 1004 may process image data according to programs when the image data are input to the processing unit 1000, and output the results of image processes to the CPU 1001.

9.3 Devices Connected to the Control Unit

Devices which are capable of communicating via the parallel I/O port and are connected to the parallel I/O controller 1020, that is, parallel I/O devices, may be the laser control unit 52, other control units, etc.

Devices which are capable of communicating via the serial I/O port and are connected to the serial I/O controller 1030, that is, serial I/O devices, may be the automatically rotating stage 50, etc.

Devices which are capable of communicating via the analog port and are connected to the A/D, D/A converter 1040, that is, analog devices, may be various sensors such as the pressure sensor 51.

Note that the description above is not limiting, but merely intended to be illustrative of examples. Therefore, it would be obvious to those skilled in the art that various modifications to the embodiments of the present disclosure would be possible as long as they do not stray from the spirit and the scope of the appended claims.

The terms which are employed in the present specification and the appended claims are to be interpreted as "not limiting". For example, the terms "include" and "including" are to be interpreted to mean "including the described elements but not limited thereto". The term "have" is to be interpreted to mean "having the described elements but not limited thereto". Further, the indefinite articles "a" and "an", as well as the word "one" in the present specification as well as the appended claims are to be interpreted to mean "at least one" or "one or more".

What is claimed is:

1. A narrow band excimer laser apparatus, comprising:
    an optical resonator;
    a laser chamber that contains an excimer laser gas and is disposed along an optical path of the optical resonator;
    a line narrowing module including a casing and a line narrowing optical element housed in the casing, the line narrowing module being provided in the optical resonator and being configured to narrow a spectral line width of laser light which is output from the laser chamber;
    a nitrogen gas supply apparatus;
    a nitrogen gas introducing unit configured to cause nitrogen gas supplied from the nitrogen gas supply apparatus to flow into the casing;
    a first valve configured to control inflow of nitrogen gas from the nitrogen gas introducing unit into the casing;
    an exhaust unit configured to cause gas within the casing to flow outside the casing;
    an exhaust pump configured to cause gas within the casing to be exhausted outside the casing through the exhaust unit;
    a second valve configured to control exhausting of gas from the exhaust unit;
    an atmosphere discharging unit configured to discharge gas within the casing to the atmosphere;
    a third valve configured to control discharging of gas by the atmosphere discharging unit;
    a control unit configured to close the second valve while opening the first valve and the third valve to supply nitrogen gas into the casing for a predetermined amount of time, then to close the first valve and the third valve while opening the second valve and driving the exhaust pump to exhaust the interior of the casing, and to cause laser oscillation thereafter; and
    a detecting unit configured to detect that one of the line narrowing module and the laser chamber has been installed in the narrow band excimer laser apparatus and to output a detection signal,
    wherein the control unit initiates control with respect to the first valve, the second valve, the third valve, and the exhaust pump after the detection signal is received.

2. The narrow band excimer laser apparatus as defined in claim 1, further comprising:
    a pressure sensor configured to detect pressure within the casing.

3. The narrow band excimer laser apparatus as defined in claim 2, wherein:
    the control unit causes laser oscillation in the case that a pressure indicated by the pressure sensor becomes a predetermined pressure or less.

4. The narrow band excimer laser apparatus as defined in claim 2, wherein:
    the control unit controls exhausting speed of the exhaust pump such that a pressure indicated by the pressure sensor falls within a predetermined range of pressures.

5. The narrow band excimer laser apparatus as defined in claim 2, wherein:
    the control unit controls the opening and closing operations of one of the first valve and the second valve such that a pressure indicated by the pressure sensor falls within a predetermined range of pressures.

6. The narrow band excimer laser apparatus as defined in claim 1, wherein:
    the casing is of a configuration that maintains the interior of the casing gastight with respect to the exterior at portions other than a portion which is in communication with the nitrogen gas introducing unit and a portion which is in communication with the exhaust unit.

7. The narrow band excimer laser apparatus as defined in claim 1, wherein:
    the first valve is a normally open type valve, and the second valve and the third valve are normally closed type valves.

8. A narrow band excimer laser apparatus, comprising:
    an optical resonator;
    a laser chamber that contains an excimer laser gas and is disposed along an optical path of the optical resonator;
    a line narrowing module including a casing and a line narrowing optical element housed in the casing, the line narrowing module being provided in the optical resonator and being configured to narrow a spectral line width of laser light which is output from the laser chamber;
    a nitrogen gas supply apparatus;
    a nitrogen gas introducing unit configured to cause nitrogen gas supplied from the nitrogen gas supply apparatus to flow into the casing;

a first valve configured to control inflow of nitrogen gas from the nitrogen gas introducing unit into the casing;

an exhaust unit configured to cause gas within the casing to flow outside the casing;

an exhaust pump configured to cause gas within the casing to be exhausted outside the casing through the exhaust unit;

a second valve configured to control exhausting of gas from the exhaust unit;

an atmosphere discharging unit configured to discharge gas within the casing to the atmosphere;

a third valve configured to control discharging of gas by the atmosphere discharging unit;

a control unit configured to close the second valve while opening the first valve and the third valve to supply nitrogen gas into the casing for a predetermined amount of time, then to close the third valve while opening the first valve and the second valve and driving the exhaust pump to exhaust the interior of the casing, and to cause laser oscillation thereafter; and a detecting unit configured to detect that one of the line narrowing module and the laser chamber has been installed in the narrow band excimer laser apparatus and to output a detection signal, wherein the control unit initiates control with respect to the first valve, the second valve, the third valve, and the exhaust pump after the detection signal is received.

9. The narrow band excimer laser apparatus as defined in claim 8, further comprising:

a pressure sensor configured to detect pressure within the casing.

10. The narrow band excimer laser apparatus as defined in claim 9, wherein:

the control unit controls the exhausting speed of the exhaust pump such that a pressure indicated by the pressure sensor falls within a predetermined range of pressures.

11. The narrow band excimer laser apparatus as defined in claim 9, wherein:

the control unit controls the opening and closing operations of the second valve such that a pressure indicated by the pressure sensor falls within a predetermined range of pressures.

12. The narrow band excimer laser apparatus as defined in claim 8, wherein:

the casing is of a configuration that maintains the interior of the casing gastight with respect to the exterior at portions other than a portion which is in communication with the nitrogen gas introducing unit and a portion which is in communication with the exhaust unit.

13. The narrow band excimer laser apparatus as defined in claim 8, wherein:

the first valve is a normally open type valve, and the second valve and the third valve are normally closed type valves.

* * * * *